(12) United States Patent
Nozaki et al.

(10) Patent No.: US 8,434,015 B2
(45) Date of Patent: Apr. 30, 2013

(54) INFORMATION PROCESSING APPARATUS, INFORMATION PROCESSING METHOD, AND INFORMATION PROCESSING PROGRAM

(75) Inventors: Megumi Nozaki, Kanagawa (JP); Mitsuo Okumura, Tokyo (JP); Shinya Miyoshi, Tokyo (JP)

(73) Assignee: Sony Corporation (JP)

( * ) Notice: Subject to any disclaimer, the term of this patent is extended or adjusted under 35 U.S.C. 154(b) by 256 days.

(21) Appl. No.: 12/661,072

(22) Filed: Mar. 10, 2010

(65) Prior Publication Data

US 2010/0241976 A1   Sep. 23, 2010

(30) Foreign Application Priority Data

Mar. 23, 2009 (JP) ................. P2009-069523

(51) Int. Cl.
*G06F 3/048* (2006.01)
*G06F 3/00* (2006.01)
*G06F 3/14* (2006.01)

(52) U.S. Cl.
USPC ........... 715/764; 715/738; 715/739; 715/773; 715/792; 715/786; 715/817; 715/830; 715/864

(58) Field of Classification Search ................. 715/738, 715/739, 773, 792, 786, 817, 830, 864, 764
See application file for complete search history.

(56) References Cited

U.S. PATENT DOCUMENTS

| | | | | |
|---|---|---|---|---|
| 6,020,887 A | * | 2/2000 | Loring et al. | 715/786 |
| 6,154,210 A | * | 11/2000 | Anderson | 715/840 |
| 2002/0186252 A1 | * | 12/2002 | Himmel et al. | 345/787 |
| 2002/0199195 A1 | * | 12/2002 | Townsend et al. | 725/60 |
| 2006/0238625 A1 | * | 10/2006 | Sasaki et al. | 348/231.3 |
| 2007/0236475 A1 | * | 10/2007 | Wherry | 345/173 |
| 2008/0143684 A1 | * | 6/2008 | Seo | 345/173 |
| 2008/0216011 A1 | * | 9/2008 | Gould | 715/786 |
| 2009/0216732 A1 | * | 8/2009 | Feng | 707/4 |
| 2010/0241976 A1 | * | 9/2010 | Nozaki et al. | 715/764 |

FOREIGN PATENT DOCUMENTS

JP    2004-343662 A    12/2004

OTHER PUBLICATIONS

Nikon Digital Camera Coolpix s60 User's Manual 2008 184 pages.*

* cited by examiner

*Primary Examiner* — Adam M Queler
*Assistant Examiner* — Andrea Long
(74) *Attorney, Agent, or Firm* — Lerner, David, Littenberg, Krumholz & Mentlik, LLP

(57) ABSTRACT

An information processing apparatus includes: a display element; an indicated position detection means whose manipulating face is placed on a display screen of the display element and which accepts an indicating manipulation performed by a user, and detects and outputs information on coordinates representing a position indicated with the indicating manipulation; a detection means for detecting the indicated position on the display screen and the style of the indicating manipulation on the basis of the information on coordinates fed from the indicated position detection means; and a display control means for dividing the display screen into a first area, in which at least item shifting operating pieces are disposed, and a second area in which display items that are objects of item shifting are displayed, and implementing control so that pieces of display information will be displayed in the first area and second area respectively.

23 Claims, 15 Drawing Sheets

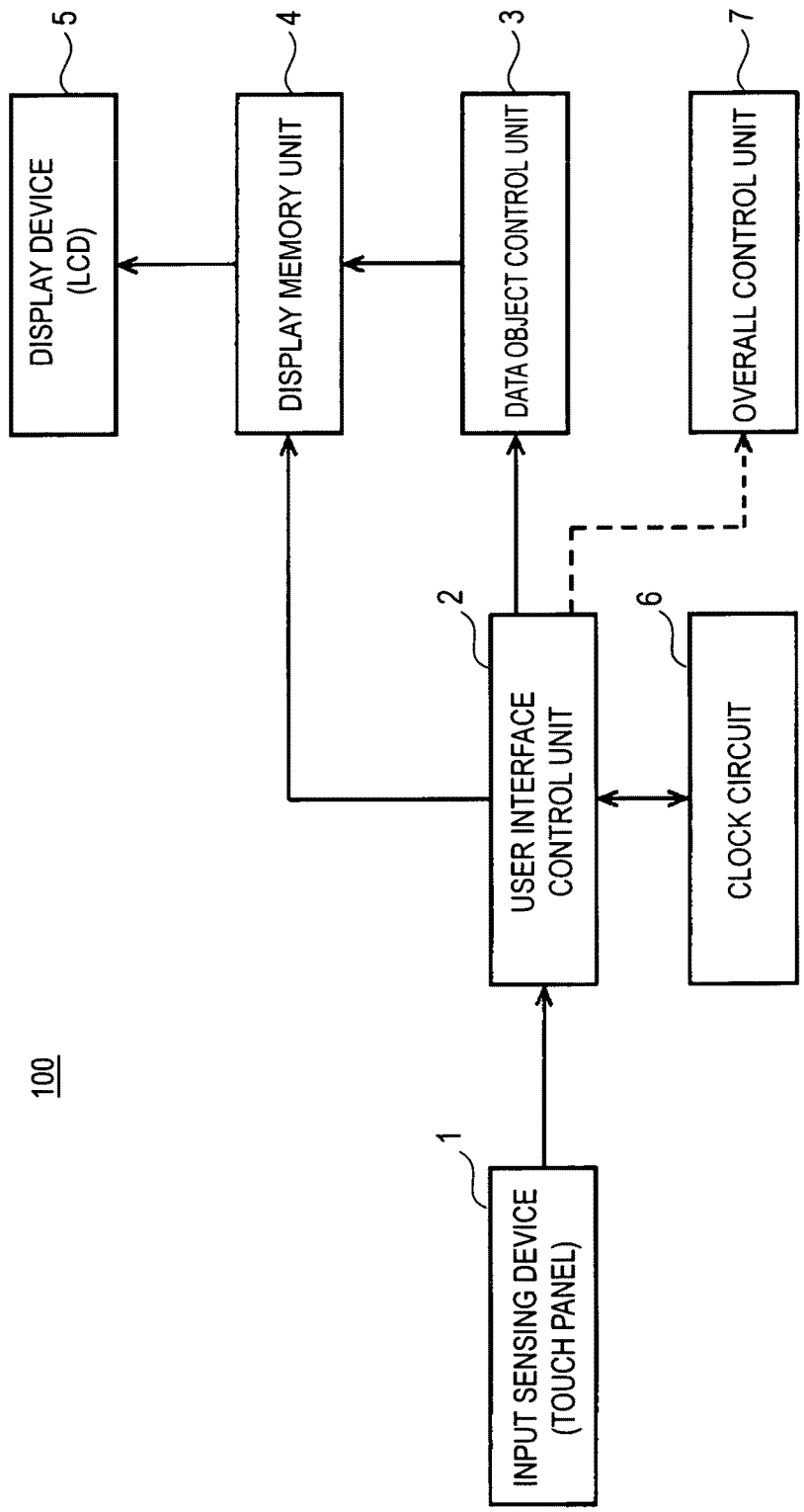

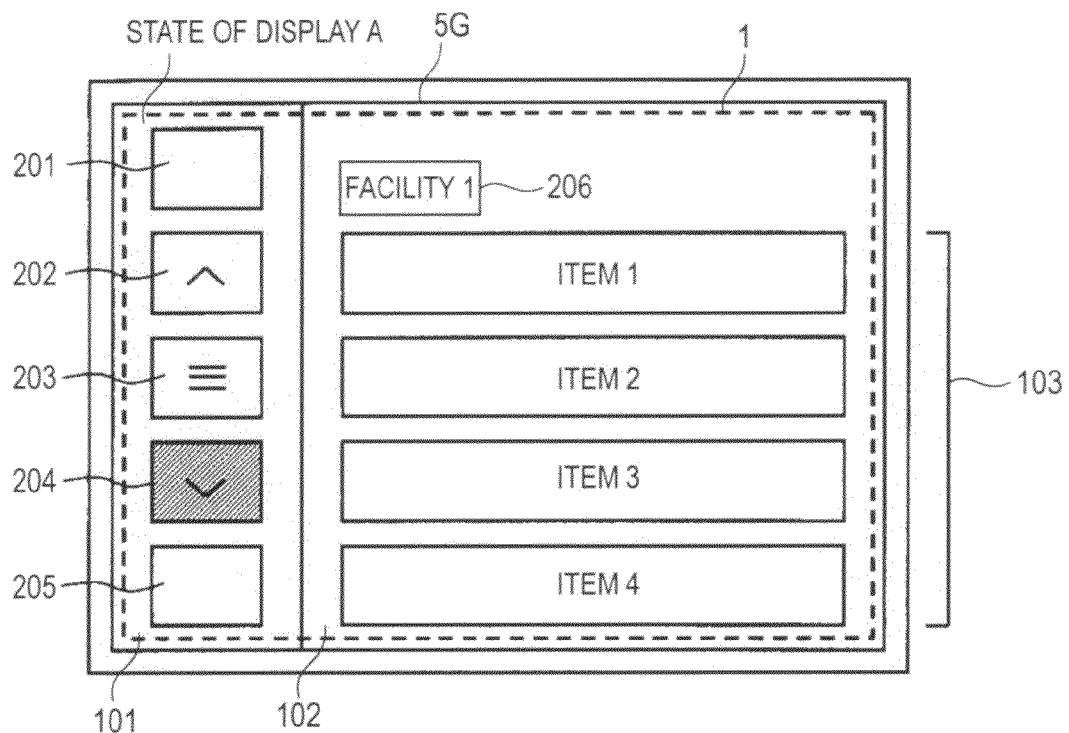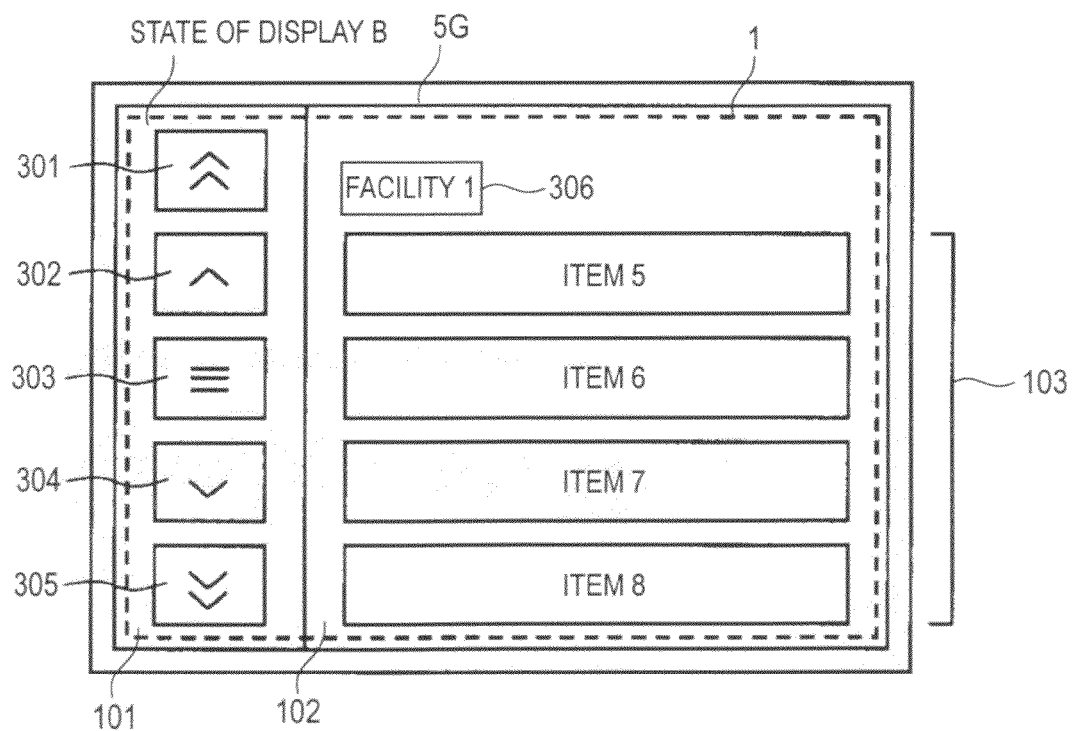

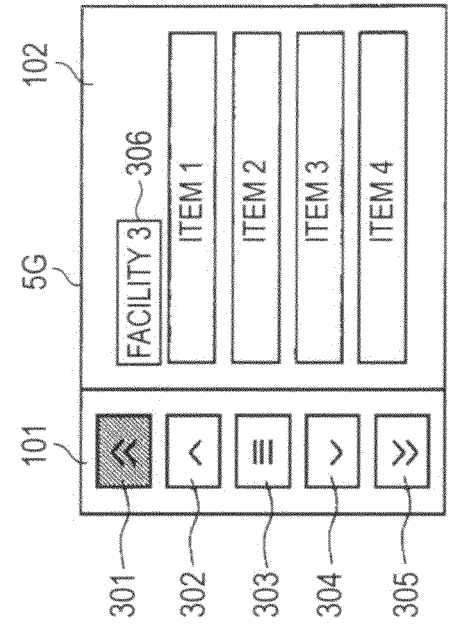
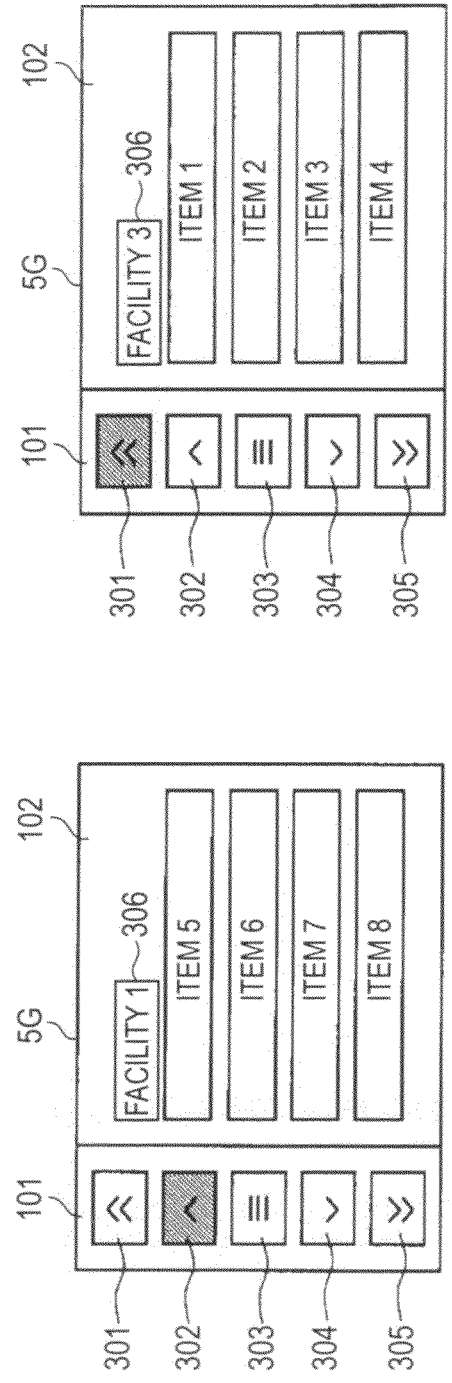
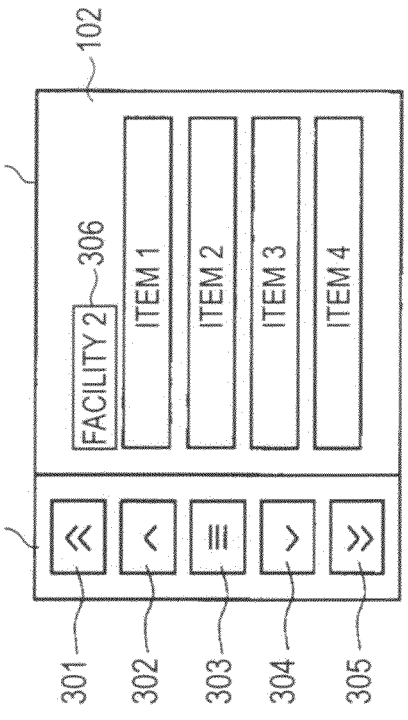
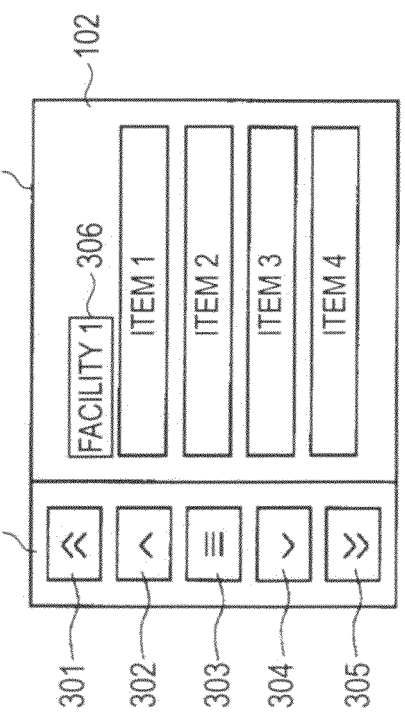

EXAMPLES OF UNIT FOR PROCESSING OF SCROLLING (DISPLAY SWITCHING)

| | CATEGORY | | | | |
|---|---|---|---|---|---|
| | FACILITY NAME | DATE | FACE-RECOGNITION INFORMATION | POSITIONAL INFORMATION | EVENT INFORMATION |
| ∧,∨ MINOR ITEM SHIFTING | IN UNITS OF ITEM | IN UNITS OF LINE | IN UNITS OF LINE | IN UNITS OF LINE | IN UNITS OF LINE |
| ≪,≫ MAJOR ITEM SHIFTING (CATEGORY-BY-CATEGORY SHIFTING) | IN UNITS OF FACILITY | IN UNITS OF DATE | IN UNITS OF PERSON (FACE) | IN UNITS OF DISTRICT | IN UNITS OF EVENT |

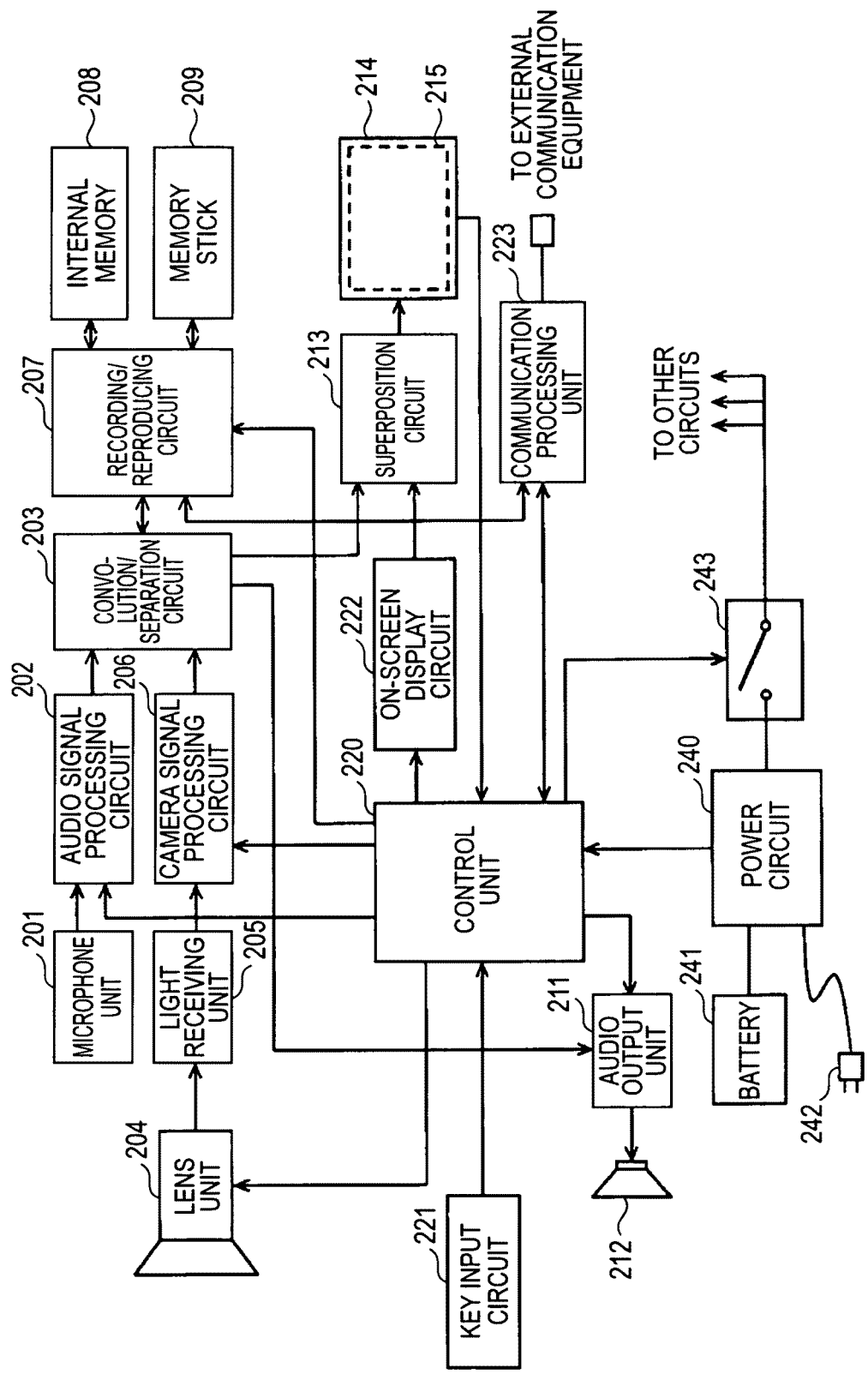

US 8,434,015 B2

INFORMATION PROCESSING APPARATUS, INFORMATION PROCESSING METHOD, AND INFORMATION PROCESSING PROGRAM

CROSS-REFERENCE TO RELATED APPLICATION

The present application claims priority from Japanese Patent Application No. JP 2009-069523 filed in the Japanese Patent Office on Mar. 23, 2009, the entire content of which is incorporated herein by reference.

BACKGROUND OF THE INVENTION

1. Field of the Invention

The present invention relates to an apparatus that includes a display device, for example, a liquid crystal display, and an input sensing device such as a touch panel disposed on the display screen of the display element, accepts a manipulative input entered by a user, and changes a display set on the display screen of the display device according to the manipulative input, a method to be implemented in the apparatus, and a program to be installed therein.

2. Description of the Related Art

Various pieces of portable electronic equipment designed to be carried and used outside home, for example, a digital video camera, a digital still camera, a portable cellular phone, and a portable music player have been utilized these days.

For the portable electronic equipment, a so-called thin display element such as a liquid crystal display (LCD) or an organic electroluminescent panel (organic EL panel) is adopted from the viewpoint of compactness and lightweight.

In the case of the portable electronic equipment, the size of the display screen of a mounted display element is often equal to or smaller than 4 inch in terms of meeting a purpose of carrying the portable electronic equipment and ensuring practicability. For example, some digital video cameras adopt a display element whose screen size is 3.2 inch. In the case of the portable cellular phone, a mounted display element has at most a screen size of about 3.5 inch.

In the portable electronic equipment, for the purpose of meeting a demand for a compact design of equipment and improving operability, a touch panel is placed on the display screen of a display element, and the display element and touch panel constitute an input unit that accepts an indicating manipulation (indicative input) entered by a user.

Therefore, when items and icons displayed on the display screen are diversely varied, a user can enter various indicative inputs at the portable electronic equipment by way of the display element and touch panel.

As an invention relating to portable electronic equipment including the input unit composed of the display element and touch panel, there is an invention disclosed in JP-A-2004-343662 (patent document 1). In the patent document 1, an invention relating to an imaging apparatus that has an operating unit composed of a display element and a touch panel and that has the operability and discernment thereof improved for smooth designation of a facility or adjustment thereof is disclosed.

SUMMARY OF THE INVENTION

In a display element whose screen size is about 3.0 inch, the size of operating buttons (operating minimum areas) which can reliably be indicated with a human finger is nearly determined. For example, as shown in FIG. 16, in a display screen G whose screen size is about 3.0 inch, 5×5 is the upper limit into which the screen can be divided. If the display screen has a smaller size, it is hard to manipulate the display screen with a human finger.

In general, in a so-called index screen image through which an intended facility or a content to be reproduced is selected, a manipulating portion that accepts an indicative input entered by a user and a display selection section that displays plural display items which are objects of selection have to be defined within a limited space.

For example, as shown in FIG. 17, one column on the leftmost side of the display screen G is regarded as a manipulating portion G1 that accepts an indicating manipulation performed by a user, and an area composed of the other columns is regarded as an item selecting portion G2 that displays display items and permits selection of the items.

Specifically, in FIG. 17, the 5×1 area on the leftmost side is the manipulating portion G1, and the other 5×4 area is the item selecting portion G2.

As shown in FIG. 17, when the manipulating portion G1 that accepts an indicating manipulation performed by a user, and the item selecting portion G2 that displays display items and permits selection of the items are included, operating keys (operating buttons) for use in scrolling the display items have to be defined. Therefore, the contents of the operating keys capable of being disposed in the manipulating portion G1 are determined in due course.

For example, as shown in FIG. 18A, when an upward shifting key U and a downward shifting key D for use in up shift and down shift are included in one column of the manipulating portion G1, only three function keys of function keys F1, F2, and F3 are defined in the manipulating portion G1.

As shown in FIG. 18B, when a first upward shifting key U1, a second upward shifting key U2, a first downward shifting key D1, and a second downward shifting key D2 that are operating keys associated with different magnitudes of shifting are included in the one column of the manipulating portion G1, only one function key of a function key F1 can be defined in the manipulating portion G1.

When the manipulating portion includes two columns, if the operating keys defined in the foregoing forms and shown in FIGS. 18A and 18B are included in one screen, the area of the item selecting portion G2 gets narrowed. This makes it hard to search or select an intended display item.

Therefore, under the foregoing restrictions, preparing two pairs of item shifting operating keys as shown in FIG. 18B for smooth search and selection of a display item, and preparing two or more function keys associated with facilities other than the facilities for shifting items can not accomplished.

Thus, it is desirable to smoothly search and select a display item by way of an input sensing device such as a touch panel placed on the display screen of a display element mounted on portable electronic equipment, and to use various facilities for different purposes.

According to an embodiment of the present invention, there is provided an information processing apparatus including:

a display element;

an indicated position detection means whose manipulating face is placed on the display screen of the display element, and which accepts an indicating manipulation performed by a user, and detects and outputs information on coordinates representing a position indicated with the indicating manipulation;

a detection means for detecting the indicated position on the display screen of the display element and the style of the indicating manipulation on the basis of the information on coordinates fed from the indicated position detection means; and a display control means for dividing the display screen of the display element into a first area in which at least item shifting operating pieces are disposed, and a second area in which display items that are objects of item shifting are displayed, and for implementing control so that pieces of display information will be displayed in the first area and second area respectively.

When the result of detection fed from the detection means signifies that a manipulation has been performed on the operating piece disposed in the first area, the display control means implements control so that the display on one or both of the first area and second area on the display screen will be changed according to a facility allocated to the operating piece.

According to the embodiment of the present invention, the manipulating face of the indicated position detection means that accepts an indicating manipulation performed by a user is placed on the display screen of the display element. When the user performs an indicating manipulation on the manipulating face of the indicated position detection means, the indicated position detection means detects information on coordinates representing a position indicated with the indicating manipulation. Based on the information on coordinates fed from the indicated position detection means, the detection means detects the indicated position on the display screen of the display element and the style of the indicating manipulation.

The display control means divides the display screen of the display element into the first area in which at least item shifting operating pieces are disposed, and the second area in which display items that are objects of item shifting are displayed, and displays pieces of display information in the first area and second area respectively.

If the result of detection fed from the detection means signifies that a manipulation has been performed on the operating piece disposed in the first area, the display control means changes the display on one or both of the displays in the first area and second area on the display screen according to a facility allocated to the operating piece.

As mentioned above, the display of at least either the first or second area can be changed according to a manipulation performed on the first area. When the display of the first area is changed, while pieces of information newly displayed in the first area are recognized as objects of manipulation, a manipulation can be continued.

Therefore, the operating pieces capable of being manipulated can be automatically changed so that a display item can be smoothly searched and selected. Thus, user's operability and user-friendliness can be improved.

According to the embodiment of the present invention, a display item can be smoothly searched and selected by way of an input sensing device such as a touch panel placed on the display screen of a display element mounted on portable electronic equipment, and various facilities can be appropriately used for different purposes.

BRIEF DESCRIPTION OF THE DRAWINGS

FIG. 1 is a block diagram for use in explaining an example of the configuration of an information processing apparatus 100 in accordance with an embodiment of the present invention;

FIG. 2 is a diagram for use in explaining an example of a first screen image that is displayed first and is an item selecting screen image;

FIG. 3 is a diagram for use in explaining an example of a second screen image into which the first screen image that is the item selecting screen image is switched;

FIGS. 11A to 11D are diagrams for use in explaining the different usages of minor item shifting keys and major item shifting keys in an item selection screen image such as a menu display;

FIGS. 12A to 12D are diagrams for use in explaining the different usages of minor item shifting keys and major item shifting keys in a selection screen image through which still image data to be outputted is selected;

FIG. 13 is a diagram for use in explaining examples of a processing unit to be employed when pieces of information capable of being classified into categories on the basis of pieces of appended index information are displayed as display items;

FIG. 15 is a block diagram for use in explaining an example of the configuration of a video camera 200 to which the information processing apparatus in accordance with the embodiment of the present invention is adapted;

DESCRIPTION OF THE PREFERRED EMBODIMENTS

Figure 4A:
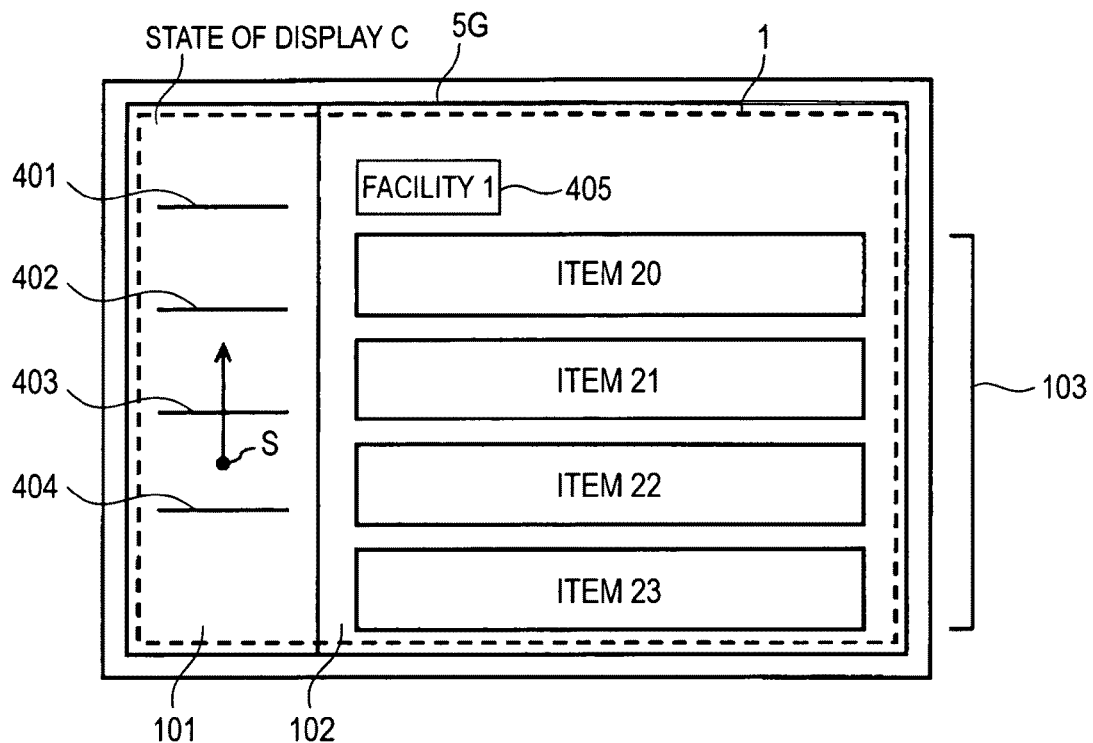
FIGS. 4A and 4B are diagrams for use in explaining a display style to which a display screen 5C is brought when a tracing manipulation is performed on the manipulating face of a user interface area 101.

Referring to the drawings, an apparatus, method, and program in accordance with an embodiment of the present invention will be described below. In the embodiment to be described below, the explanation will be made to an information processing apparatus including an input section composed of a display device (display element) and an input sensing device (indicated position detection means) to which the present invention is applied. Subsequently, explanation will be made to an imaging apparatus to which the present invention is applied will be described as a more concrete example.

[Example of the Configuration of an Information Processing Apparatus]

FIG. 1 is a block diagram for use in explaining an example of the configuration of an information processing apparatus 100 in accordance with an embodiment of the present invention.

As shown in FIG. 1, the information processing apparatus 100 includes an input sensing device 1, a user interface control unit 2, a data object control unit 3, a display memory unit 4, a display device 5, a clock circuit 6, and an overall control unit 7.

The input sensing device 1 is formed with, for example, a pressure-sensitive or electrostatic touch panel. The input sensing device 1 accepts an indicating manipulation (touching manipulation) performed on the manipulating face of the input sensing device 1 by a user, detects the indicated position (contact position) on the manipulating face, and outputs coordinate data (information on coordinates) representing the indicated position.

The display device 5 includes a so-called thin display element, for example, an LCD or an organic electroluminescent (EL) panel, and a controller that controls a display on the display element.

The input sensing device 1 is, for example, attached to the entire surface of the display screen of the display element of the display device 5. In other words, the manipulating face of the input sensing device 1 is joined with the display screen of the display element of the display device 5.

Therefore, coordinates on the display screen of the display device 5 are conformed to coordinates on the manipulating face of the input sensing device 1. Assume that a user touches a position on the manipulating face of the input sensing device 1 with his/her finger or a stylus.

In this case, if a numeral is displayed at the position on the display screen conforming to the contact position, the control unit of the apparatus decides that the user has selected and entered the displayed numeral.

In the information processing apparatus 100 of the present embodiment, the input sensing device 1 and display device 5 constitute an input section (input means) that accepts an indicating manipulation performed (an indicative input entered) by a user.

The user interface control unit 2, data object control unit 3, and overall control unit 7 are realized with, for example, one microcomputer. Alternatively, the control units may be realized with independent microcomputers.

The microcomputer has a central processing unit (CPU), a read-only memory (ROM), a random access memory (RAM), and an electrically erasable and programmable ROM (EEPROM) interconnected over a CPU bus.

Now, the CPU reads and runs a program stored and preserved in the ROM, and thus executes intended processing. More particularly, the CPU runs a program stored and preserved in the ROM, performs various computations, and notifies the components of the apparatus of the results of computations, or uses data items fed from the components to perform computations, and stores the results of the computations in the memory.

The ROM has programs, which are run by the CPU, and various data items, which are necessary to perform pieces of processing, stored in advance therein. The RAM is used mainly as a work area in which an intermediate result of any of pieces of processing is temporarily stored.

The EEPROM is a so-called nonvolatile memory and used to store and preserve information, which has to be preserved even in case the information processing apparatus 100 is powered down, for example, various setting parameters and a program used to add a facility.

The display memory unit 4 is a memory unit dedicated to display and formed with, for example, a RAM, and includes a memory controller. The clock circuit 6 provides a current time instant, and has the capability of a calendar so as to provide information on a current year/month/day or a current day of week. The clock circuit 6 has the capability of a so-called counter that measures a time (period), which elapses since an indicated timing, under the control of the user interface control unit 2.

The overall control unit 7 controls the components of the apparatus according to an entering manipulation performed on the manipulating face of the input sensing device 1 by a user, and performs processing according to a user's indication.

In the information processing apparatus 100 of the present embodiment, when a finger or stylus is brought into contact with plural positions on the manipulating face of the input sensing device 1, the input sensing device 1 can detect manipulations performed concurrently. The input sensing device 1 can output coordinate data items representing the contact positions.

The input sensing device 1 detects indicating manipulations performed repeatedly on the manipulating face of the input sensing device 1, and outputs coordinate data items representing the respective contact positions.

Further, while a finger or stylus is in contact with the manipulating face of the input sensing device 1 by a user, the input sensing device 1 continuously detects a contact position every time a predetermined timing comes, and outputs coordinate data representing the contact position.

The input sensing device 1 accepts various indicating manipulations (manipulative inputs) performed by a user, such as, a so-called tapping manipulation, a double-tapping manipulation, a dragging manipulation, a flicking manipulation, and a pinching manipulation, and detects information on coordinates responsively to the manipulation.

The tapping manipulation is an action (manipulation) to be performed to indicate a predetermined point on the manipulating face of the input sensing device 1 by tapping the point once with a user's finger or a stylus. The double-tapping manipulation is an action to be performed to indicate a predetermined point on the manipulating face of the input sensing device 1 by continuously tapping the point twice.

The dragging manipulation is an action to be achieved by moving a user's finger or a stylus with the finger or style held in contact with the manipulating face of the input sensing device 1. The flicking manipulation is an action to be achieved by bringing a user's finger or a stylus into contact with the manipulating face of the input sensing device 1, and then quickly flicking it in an arbitrary direction.

The pinching manipulation is an action to be achieved by simultaneously bringing two user's fingers into contact with the manipulating face of the input sensing device 1, and then opening or closing the two fingers. In particular, a manipulation of opening the two fingers that are in contact with the manipulating face is called an opening manipulation, and a manipulation of closing the two fingers is called the pinching manipulation.

The dragging manipulation and flicking manipulation are different from each other in the speed of an action. However, the dragging and flicking manipulations are manipulations to be achieved by bringing a user's finger or the like into contact with the manipulating face, and then moving it on the manipulating face (tracing on the manipulating face), and are grasped with two pieces of information on a moving distance and a moving direction.

Therefore, the dragging manipulation and flicking manipulation may be called a tracing manipulation or a gestural manipulation. Even in the specification, when the tracing manipulation is mentioned, it is used as a generic term encompassing the dragging manipulation and flicking manipulation.

[Outline of Actions to be Performed in the Information Processing Apparatus 100]

In the information processing apparatus 100 of the present embodiment, for an item selection screen image such as a so-called index screen image permitting selection of a display item, the display screen of the display element of the display device 5 is broadly divided into two areas.

One of the areas is a user interface area (first area) in which at least item shifting operating keys for feeding display items are disposed and through which an indicating manipulation such as a tapping manipulation or tracing manipulation performed by a user is accepted.

The other area is an items-and-others display/selection area (second area) in which a group of items associated with executable facilities and a group of items associated with reproducible contents are displayed, and through which a tapping manipulation performed by a user is accepted in order to permit selection of a display item.

When an indicating manipulation is performed on the manipulating face of the input sensing device 1 over the user interface area, the input sensing device 1 detects an indicated position on the manipulating face, and feeds information on coordinates (coordinate data) representing the indicated position to the user interface control unit 2.

When a finger or the like is held in contact with the manipulating face of the input sensing device 1 over the user interface area, the input sensing device 1 detects information on coordinates, which represent a contact position on the manipulating face, every time a predetermined timing comes. In this case, the detected coordinate data items are successively posted to the user interface control unit 2.

Therefore, based on the coordinate data fed from the input sensing device 1, the user interface control unit 2 can accurately grasp how the contact position of a user's finger or the like has changed from when the finger is brought into contact with the manipulating face of the input sensing device 1 to when the finger is released.

The user interface control unit 2 decides what is an operating key (operating button) displayed at the indicated position on the user interface area. Namely, the user interface control unit 2 or data object control unit 3 grasps what display is set at what position on the display screen.

Based on the information on coordinates fed from the input sensing device 2, the user interface control unit 2 can decide which of the operating keys displayed in the user interface area has been manipulated by a user.

According to the manipulated operating key, the user interface control unit 2 controls one or both of the display memory unit 4 and data object control unit 3, and thus changes the display on one or both of the user interface area and items-and-others display/selection area.

In the user interface area, a first display including item shifting operating keys and other plural facility operating keys, and a second display dedicated to item shifting can be switched and displayed as detailed later.

When the first display is set in the user interface area, if the item shifting operating key in the user interface area is indicated, the user interface control unit 2 changes the displays in both of the user interface area and items-and-others display/selection area.

In this case, the user interface control unit 2 changes the display in the user interface area on the display screen, which is preserved in the display memory control unit 4, into the predetermined second display.

Further, the user interface control unit 2 instructs the data object control unit 3 to shift display items in a direction consistent with a user's indication. In response to the instruction fed from the user interface control unit 2, the data object control unit 3 shifts the display of display items, which is set in the items-and-others display/selection area on the display screen and preserved in the display memory unit 4, in the direction consistent with the user's indication.

When the first display is set in the user interface area, if a facility operating key in the user interface area is indicated, the user interface control unit 2 changes the display on the entire display screen according to the selected facility.

In this case, the user interface control unit 2 controls the display memory unit 4, or controls the data object control unit 3 and display memory unit 4 so as to prepare a display in the display memory unit 4 according to the facility indicated by the user.

The display device 5 sets the display, which has the changed contents of display in the display memory unit 4, on the display screen of the display element thereof.

Accordingly, once a manipulation is performed on the manipulating face of the input sensing device 1 over the user interface area of the display screen, both of the display in the user interface area and the display in the items-and-others display/selection area can be changed.

When the second display is set in the user interface area, if the item shifting operating key in the user interface area is indicated, the user interface control unit 2 changes the display in the items-and-others display/selection area alone.

In this case, the user interface control unit 2 instructs the data object control unit 3 to shift display items in a direction consistent a user's indication. In response to the instruction fed from the user interface control unit 2, the data object control unit 3 shifts the display of display items, which is set in the items-and-others display/selection area of the display screen and preserved in the display memory unit 4, in the direction consistent with the user's indication.

The display device 5 sets a display, which has the changed contents of display preserved in the display memory unit 4, on the display screen of the display element thereof. Therefore, once a manipulation is performed on the manipulating face of the input sensing device 1 over the user interface area of the display screen, the display in the items-and-others display/selection area alone can be changed.

Assume that either of the first and second displays is set in the user interface area and a display switching key is set in the display. In this case, the user interface control unit 2 changes the display in the user interface area of the display screen, which is preserved in the display memory control unit 4, into another display.

More particularly, when the first display is set in the user interface area, the first display is changed to a second display. When the second display is set therein, the second display is changed to the first display.

As mentioned above, the display device 5 sets a display, which has the changed contents of display preserved in the display memory unit 4, on the display screen of the display element thereof. Therefore, once a manipulation is performed on the manipulating face of the input sensing device 1 over the user interface area of the display screen, the display in the user interface area alone can be changed between the first display and second display.

As mentioned above, when the display in the user interface area is switched from the first display to the second display, the clock circuit 6 measures a time elapsing after the first display is switched to the second display.

If an indicating manipulation is not performed on the user interface area, in which the second display is set, within a certain time, the user interface control unit 2 controls the display memory unit 4 so as to return the display in the user interface display from the second display to the first display.

As mentioned above, the display device 5 sets a display, which has the changed contents of display preserved in the display memory unit 4, on the display screen of the display element thereof. Therefore, while the second display is set in the user interface area, if the second display is not used for a certain period of time, the display in the user interface area is automatically switched to the first display.

As mentioned above, the information processing apparatus 100 of the present embodiment can appropriately control the display in the user interface area and the display in the items-and-others display/selection area according to a simple indicating manipulation performed by a user. The information processing apparatus 100 of the present embodiment optimizes the display in the user interface area for a user all the time.

[Concrete Example of a Display on the Display Screen]

Next, a description will be made of concrete examples of a display to be set on the display screen of the display device 5 included in the information processing apparatus 100 of the present embodiment. FIG. 2 to FIG. 4B are diagrams for use in explaining concrete examples of a display to be set on the display screen of the information processing apparatus 100 of the present embodiment.

[Changing a Display Responsively to a Tapping Manipulation]

FIG. 2 and FIG. 3 are diagrams for use in explaining examples of an item selection screen display (index screen image) such as a menu display. FIG. 2 shows an example of a first screen image that is displayed first and is the item selection screen image, and FIG. 3 shows an example of a second screen image into which the first screen image that is the item selection screen image is switched.

As shown in FIG. 2 and FIG. 3, since the input sensing device 5 is, for example, attached to the entire display screen 5G of the display element of the display device included in the information processing apparatus 100, the manipulating face of the input sensing device 1 is formed as indicated with a dashed line in FIG. 2 and FIG. 3.

In the examples, a user interface area 101 is defined on the leftmost side of the display screen 5G. The portion of the display screen 5G other than the user interface area 101 on the leftmost side is defined as an items-and-others display/selection area 102.

As shown in FIG. 2 and FIG. 3, the user interface area 101 and items-and-others display/selection area 102 have the same length in the lengthwise direction of the display screen 5G (direction along the short sides of the display screen 5G).

However, the user interface area 101 and items-and-others display/selection area 102 are defined so that the ratio of the lengths in the sideways direction of the display screen 5G (direction along the long sides of the display screen 5G) will be, for example, about 1:4.

The ratio is a mere example. The user interface area 101 and items-and-others display/selection area 102 may be defined at any of various positions within the display screen 5G to have any of various sizes.

In the information processing apparatus 100 of the present embodiment, the user interface area 101 is, as mentioned above, a portion in which at least item shifting operating keys for feeding display items are disposed and which accepts an indicating manipulation such as a tapping manipulation or a tracing manipulation performed by a user.

The items-and-others display/selection area 102 is a portion in which a group of items associated with executable facilities and a group of items associated with reproducible contents are displayed and which accepts a tapping manipulation performed by a user and permits selection of a display item.

In the examples, as shown in FIG. 2 and FIG. 3, a group of data objects 103 including four display items (data objects) at most is displayed in the items-and-others display/selection area 102. When the number of display items is small, three or less display items may be displayed.

In the items-and-others display area 102, a facility indicator 206 or 306 is also displayed in order to indicate with what facility the displayed group of data objects 103 is associated. Specifically, the information processing apparatus 100 has numerous facilities, and display items (data objects) associated with pieces of executable processing are displayed in relation to each of the facilities.

In the case of an example of the first screen image that is the item selection screen image shown in FIG. 2, five operating keys 201 to 205 are, as shown as a state of display A, displayed in the user interface area 101.

Among the five operating keys, the operating keys 201 and 205 are facility operating keys for use in switching facilities. More particularly, the facility operating key 201 is a "closing key" for use in closing the item selection screen image. The facility operating key 205 is a "My Menu key" for use in displaying My Menu in which some facilities that a user often uses are registered.

The operating keys 202 and 204 are item shifting operating keys for use in shifting display items displayed in the items-and-others display/selection area 102. More particularly, the item shifting operating key 202 is used to scroll the display items, which are displayed in the items-and-others display/selection area 102, in a back direction. The item shifting operating key 204 is used to scroll the display items, which are displayed in the items-and-others display/selection area 102, in an advance direction.

In FIG. 2, the item shifting operating keys 202 and 204 are used to return or advance the display items, which are displayed in the items-and-others display/selection area 102, in units of, for example, four items.

As mentioned above, the item shifting operating keys 202 and 204 have the capability of minor item shifting keys that have the unit for shifting display items set to a unit of a display item.

The operating key 203 is a display switching key for use in switching displays to be set in the user interface area 101. When the display switching key 203 is depressed, the display in the user interface area 101 is, as detailed later, switched to a display that is, as shown in FIG. 3, set in the user interface area 101 in a state of display B.

As mentioned above, in the first screen image shown in FIG. 2, the display taking on the state of display A (first display) is set in the user interface area 101. The state of display A is a state in which the back-direction minor item shifting key 202 and advance-direction minor item shifting key 204 are included as a pair of item shifting keys. In the state of display A, the closing key 201 and My Menu key 205 serving as facility operating keys, and the display switching key 203 are included.

Assume that when the first screen image that is the item selection screen image and shown in FIG. 2 is displayed, a tapping manipulation is performed on the manipulating face of the input sensing device 1 over the user interface area.

In this case, the user interface control unit 2 included in the information processing apparatus 100 decides based on information on coordinates, which is fed from the input sensing device 1, on which of operating keys the tapping manipulation is performed by a user, and performs processing associated with the operating key.

More particularly, assume that when the first screen image that is the item selection screen image and shown in FIG. 2 is displayed, a user's finger or the like is brought into contact with the manipulating face of the input sensing device 1 at the displayed position of the advance-direction minor item shifting key 204.

In this case, the user interface control unit 2 included in the information processing apparatus 100 controls, as mentioned above, the display memory unit 4, and changes the display in the user interface area 101 from the state of display A (first display) to the state of display B (second display) shown in FIG. 3.

Further, the user interface control unit 2 controls the data object control unit 3 so as to shift display items in the advance direction. The data object control unit 3 controls the display memory unit 4 so as to advance the display items, which are displayed in the items-and-others display/selection area 102, by four items.

When the state shown in FIG. 2 is established, if the back-direction minor item shifting key 202 is manipulated, display control identical to that implemented when the advance-direction minor item shifting key 203 is manipulated is implemented, though a scrolling direction in which the display items in the items-and-others display/selection area 102 are scrolled is different.

Specifically, in this case, the display in the user interface area 101 is switched from the state of display A to the state of display B, and the display items in the items-and-others display/selection area 102 are scrolled in the back direction.

In the example shown in FIG. 2, as for the display items in the items-and-others display/selection area 102, four leading items associated with a facility 1 are displayed. When the back-direction minor item shifting key 202 is manipulated, the display items are changed to display items associated with any other facility preceding the facility 1.

When the state shown in FIG. 2 is established, if a tapping manipulation is performed on the display switching key 203 displayed in the user interface area 101, the display in the user interface area alone is changed from the state of display A to the state of display B.

When the state shown in FIG. 2 is established, if the facility operating keys 201 and 205 displayed in the user interface area 101 are manipulated, the display of the entire display screen 5G is changed according to facilities allocated to the keys.

As mentioned above, when the state shown in FIG. 2 is established, if one of the pair of minor item shifting operating keys 202 and 204 is manipulated, the display in the user interface area 101 is switched to another, and the display in the items-and-others display/selection area 102 is changed to another.

When the state shown in FIG. 2 is established, if the display switching key 203 is manipulated, the display in the user interface area 101 alone is switched to another.

When the state shown in FIG. 2 is established, if the facility operating key 201 or 205 is manipulated, the display of the entire display screen 5G is changed to another according to the selected facility.

In the example of the second screen image that is an item selection screen image and shown in FIG. 3, five operating keys 301 to 305 are, as shown as the state of display B, displayed in the user interface area 101.

Among the operating keys, the operating keys 301 and 305, and the operating keys 302 and 304 are pairs of item shifting operating keys. Therefore, two pairs of item shifting operating keys are available in total.

The operating keys 302 and 304 correspond to the minor item shifting keys 202 and 204 in the state of display A shown in FIG. 2. Specifically, the back-direction minor item shifting key 302 is used to scroll display items, which are displayed in the items-and-others display/selection area 102, in the back direction. The advance-direction minor shifting key 304 is used to scroll the display items, which are displayed in the items-and-others display/selection area 102, in the advance direction.

In FIG. 3, the minor item shifting operating keys 302 and 304 are used to restore or advance the display items, which are displayed in the items-and-others display/selection area 102, in units of four items.

The operating keys 301 and 305 change a larger number of display items displayed in the items-and-others display/selection area 101 than the minor item shifting keys 302 and 304 do. More particularly, the operating keys 301 and 305 are used to change currently displayed display items into display items belonging to a different category.

As an example of categories, facilities employed in the information processing apparatus 100 are taken for instance. For example, assume that the display items currently displayed in the items-and-others display/selection area 102 are associated with a facility 3.

In this case, when the operating key 301 is manipulated, the display items displayed in the items-and-others display/selection area 102 can be changed to display items associated with a facility preceding the current facility 3, such as, a facility 2 or a facility 1.

When the operating key 305 is manipulated, the display items displayed in the items-and-others display/selection area 102 can be changed to display items associated with a facility succeeding the current facility 3, such as, a facility 4 or a facility 5.

As mentioned above, the operating keys 301 and 305 have the capability of major item shifting operating keys having the unit for shifting display items set to a unit of a category.

An operating key 303 is a display switching key for use in switching the display set in the user interface area 101 to another. When the display switching key 303 is depressed, the display in the user interface area 101 is switched into the display that is, as shown in FIG. 2, set in the user interface area 101 in the state of display A.

As mentioned above, in the second screen image shown in FIG. 3, the display taking on the state of display B (second display) is set in the user interface area 101.

Herein, the state of display B is a state in which the back-direction major item shifting key 301 and advance-direction major item shifting key 305 are included as a pair of major item shifting keys. In the state of display B, the back-direction minor item shifting key 302 and advance-direction minor item shifting key 304 are included as a pair of minor item shifting keys. Therefore, in the state of display B, a display includes two pairs of item shifting keys. Further, in the state of display B, the display includes the display switching key 303.

Assume that when the second screen image that is an item selection screen image and is shown in FIG. 3 is displayed, a tapping manipulation is performed on the manipulating face of the input sensing device 1 over the user interface area.

In this case, as mentioned above, the user interface control unit 2 of the information processing apparatus 100 decides based on information on coordinates, which is fed from the input sensing device 1, on which of operating keys the tapping manipulation is performed by a user, and then carries out processing associated with the operating key.

Assume that a user's finger or the like is brought into contact with the manipulating face of the input sensing device 1 at the displayed position of any of the item shifting keys 301, 302, 304, and 305 in the user interface area 101.

In this case, the user interface control unit 2 controls the data object control unit 3 to change the display items which are displayed in the items-and-others display/selection area 102, into others. Namely, even when any of the item shifting keys 301, 302, 304, and 305 in the user interface area 101 is manipulated, the display in the items-and-others display/selection area 102 alone is changed to another.

In this case, the data object control unit 3 controls the display memory unit 4 under the control of the user interface control unit 2 so as to scroll the display items in the items-and-others display/selection area 102 in an indicated direction or switch the display items into the display items associated with any other facility.

When the state shown in FIG. 3 is established, if the display switching key 303 displayed in the user interface area 101 is manipulated, the display in the user interface area alone is switched from the state of display A to the state of display B.

Further, in the information processing apparatus 100 of the present embodiment, when the display in the user interface area 101 is switched from the state of display A shown in FIG. 2 to the state of display B shown in FIG. 3, the clock circuit 6 measures a period during which no manipulation is performed by a user.

If no manipulation is performed on the user interface area 101, in which the display taking on the state of display B is set, until the elapse of a certain time is measured by the clock circuit 6, the display in the user interface area 101 is returned from the state of display B to the state of display A.

Specifically, the information processing apparatus 100 detects a case where the necessity of scrolling the display items displayed in the items-and-others display/selection area 102 is obviated, so that the display in the user interface area 101 will be automatically restored to the state of display A. In this case, the user interface control unit 2 controls the display memory unit 4 so as to change the display in the user interface area into another.

As mentioned above, in this example, when the state shown in FIG. 3 is established, if a tapping manipulation is performed on any of the operating keys 301, 302, 304, and 305, the display in the items-and-others display/selection area 102 alone is changed to another.

When the state shown in FIG. 3 is established, if the display switching key 303 is manipulated, the display in the user interface area 101 alone can be switched to another.

Further, when the state shown in FIG. 3 is established, if no manipulation is performed on the user interface area 101 within a predetermined time, the display in the user interface area 101 is automatically changed from the state of display B to the state of display A.

As mentioned above, in the information processing apparatus 100 of the present embodiment, when the first screen image shown in FIG. 2 is displayed, if a tapping manipulation is performed on the minor item shifting key 202 or 204, a transition is made to the second screen image shown in FIG. 3. Namely, the displays in both the user interface area 101 and items-and-others display/selection area 102 are changed to others.

Therefore, with one action, the display items in the items-and-others display/selection area 102 are scrolled in a direction consistent with a user's indication, and the display in the user interface area 101 is changed into the state of display B that is more suitable for the changed display of display items. Therefore, the user-friendliness in searching display items to be displayed in the items-and-others display/selection area 102 can be improved.

In the information processing apparatus 100 of the present embodiment, when the second screen image shown in FIG. 3 is displayed, if the item shifting key 301, 302, 304, or 305 is manipulated, the display in the items-and-others display/selection area 102 alone is changed to another. Therefore, when searching display items to be displayed in the items-and-others display/selection area 102 is carried on, the display in the state of display B more suitable for the search can be used to search the display items.

In the information processing apparatus 100 of the present embodiment, in a state in which the screen image shown in FIG. 2 or FIG. 3 is displayed, if the display switching key 203 or 303 is manipulated, the display in the user interface area 101 alone is changed to another.

Therefore, a user can appropriately switch the state of display A and state of display B according to his/her own necessity, search display items to be displayed in the items-and-others display/selection area, or quickly execute any other facility.

Further, when the display taking on the state of display B is set in the user interface area 101, if no manipulation is performed on the user interface area 101 for a certain period of time, the display in the user interface area 101 is automatically changed to the display taking on the state of display A.

The displays taking on the state of display A and state of display B respectively and set in the user interface area 101 are used to change the display items displayed in the items-and-others display/selection area 102 to others by sequentially scrolling display items. Meanwhile, an intended display item can be searched.

When the intended display item is displayed in the items-and-others display/selection area 102, once a tapping manipulation is performed on a point on the manipulating face of the input sensing device coinciding with the displayed position, processing associated with the selected display item is executed by the facility of the overall control unit 7.

[Processing to be Performed when an Operating Key is Held Depressed]

A description has been made of a case where a tapping manipulation is performed on the manipulating face of the input sensing device 1 over the user interface area 101. However, a user's manipulation is not limited to the tapping manipulation. Any other manipulation may therefore be performed.

For example, there are some cases in which a finger or the like may be held in contact with a point on the manipulating face of the input sensing device 1 coinciding with the displayed position of a predetermined operating key in the user interface area 101 and therefore, the operating key is held depressed.

Even in the case where an operating key is held depressed, basically, the same processing is performed as that in a case where the tapping manipulation is performed. However, when an item shifting operating key is held depressed, scrolling display items or changing the display of display items in the items-and-others display/selection area is repeatedly carried out according to the item shifting operating key.

Specifically, assume that the back-direction minor item shifting key 202 in the user interface area in the first screen image shown in FIG. 2 is held depressed. In this case, the display in the user interface area 101 is changed to the display taking on the state of display B shown in FIG. 3. While the key is held depressed, the display items in the items-and-others display/selection area 102 are repeatedly scrolled in the back direction in units of four items.

In the first screen image shown in FIG. 2, if the advance-direction minor item shifting key 204 in the user interface area is held depressed, the same processing as that performed when the back-direction minor item sensing operating key 202 is held depressed is carried out, though the scrolling direction is reverse.

In the second screen image shown in FIG. 3, if the item shifting key 301, 302, 304, or 305 is held depressed, the display in the user interface area 101 remains unchanged. However, the display of display items in the items-and-others display/selection area is repeatedly changed to another according to the item shifting key held depressed.

[Changing a Display According to a Tracing Manipulation]

As described previously, the input sensing device 1 of the information processing apparatus 100 of the present embodiment can accept a tracing manipulation to be performed on the own manipulating face. In particular, when the tracing manipulation is performed on the manipulating face of the input sensing device 1 over the user interface area 101, a group of display items (a group of data objects) 103 in the items-and-others display/selection area 102 can be scrolled and displayed.

In this case, when the display in the user interface area 101 takes on the state of display A shown in FIG. 2, if a tracing manipulation is begun at a point on the manipulating face of the input sensing device 1 coinciding with the minor item shifting operating key 202 or 204, the group of display items can be scrolled.

When the display in the user interface area 101 takes on the state of display B shown in FIG. 3, if a tracing manipulation is begun at a point on the manipulating face of the input sensing device 1 coinciding with the item shifting operating key 301, 302, 304, or 405, the group of display items can be scrolled.

Figure 4B:
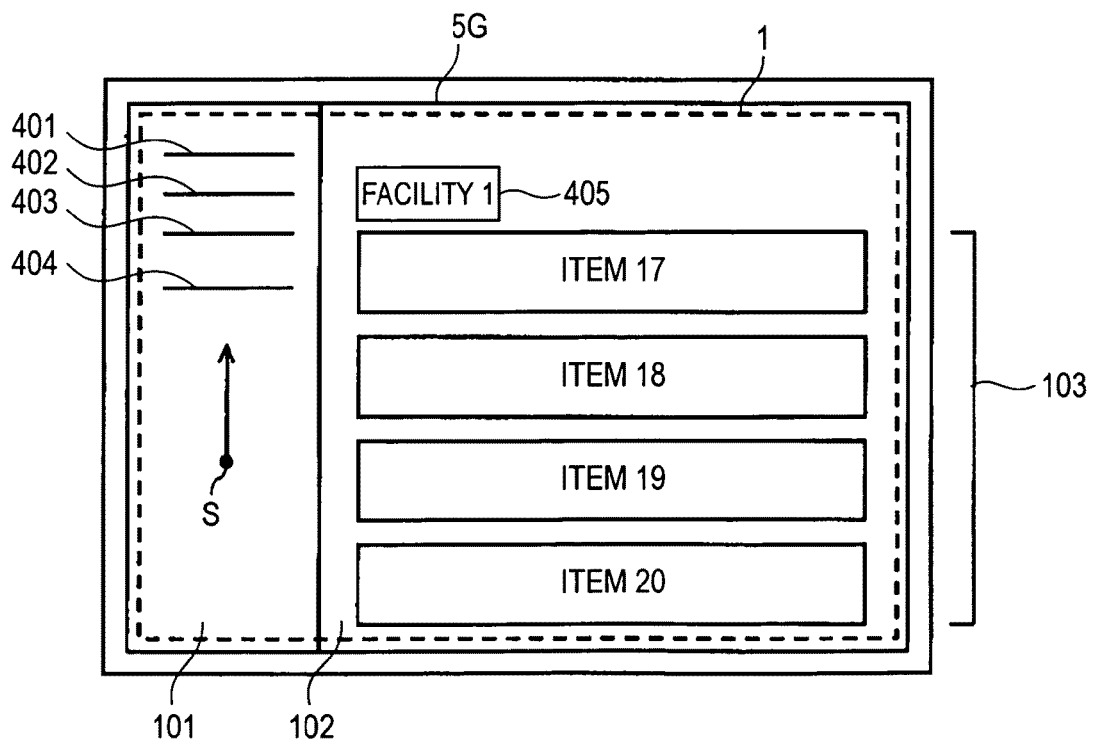

FIGS. 4A and 4B are diagrams for use in explaining the display style for the display screen 5G employed in a case where a tracing manipulation that encompasses a dragging manipulation and a flicking manipulation is performed on the manipulating face of the input sensing device 1 over the user interface area 101.

Assume that when the display in the user interface area 101 takes on the state of display A shown in FIG. 2 or the state of display B shown in FIG. 3, a tracing manipulation is begun at the minor item shifting operating key or major item shifting operating key.

In this case, the user interface control unit 2 senses based on pieces of information on coordinates, which are fed from the input sensing device 1, that a tracing manipulation has been performed. When sensing that a tracing manipulation has been performed, the user interface control unit 2 controls the display memory unit 5 so as to change the display in the user interface area 101 into a state of display C shown in FIG. 4A.

The state of display C is a state in which, for example, border symbols 401, 402, 403, and 404 that are segments are included. In this example, the border symbols 401, 402, 403, and 404 are displayed to quarter the user interface area 101 in the lengthwise direction of the display screen 5G (direction along the short sides of the display screen 5G).

Based on pieces of information on coordinates successively fed from the input sensing device 1, the user interface control unit 2 grasps the direction of the tracing manipulation and the magnitude of the tracing manipulation.

The user interface control unit 2 controls the display memory unit 4 according to the grasped direction and magnitude of the tracing manipulation so as to change the displayed positions of the border symbols in the user interface area 101 into others.

For example, a position S in FIG. 4A is regarded as a tracing manipulation beginning point, and a tracing manipulation is assumed to be performed as indicated with an arrow beginning at the point. In this case, the border symbols 401, 402, 403, and 404 are moved or pushed to the upper side of the user interface area 101.

When the display style of the border symbols 401, 402, 403, and 404 is thus changed according to a tracing manipulation, to what degree and in what direction a user is performing a tracing manipulation can be clearly informed the user.

The user interface control unit 2 notifies the data object control unit 3 of the grasped direction and magnitude of the tracing manipulation. The data object control unit 3 in turn controls the display memory unit 4 so as to scroll the group of display items 103 in the items-and-others display/selection area 102.

Accordingly, for example, when the state shown in FIG. 4A is established, if a tracing manipulation is performed as indicated with an arrow in the user interface area 101, the group of display items 103 in the items-and-others display/selection area 102 can be scrolled as shown in FIG. 4B.

Incidentally, the direction and magnitude of a tracing manipulation are obtained with the tracing manipulation beginning point S as a reference.

Therefore, when a tracing manipulation begun at the beginning point S is continuously performed in an upward or downward direction within the user interface area 101, the magnitude of the tracing manipulation is grasped to increase in a direction in which a manipulated position recedes from the beginning point S. When the tracing manipulation is performed so that the manipulated position will approach the beginning point S, the direction of the tracing manipulation remains unchanged until the manipulated position reaches the beginning point S. The magnitude of the tracing manipulation is grasped to decrease.

While a tracing manipulation is being performed, the direction and magnitude of the tracing manipulation are detected by the input sensing device 1 every time a predetermined timing comes. Every time the predetermined timing comes, the latest state is grasped based on pieces of information on coordinates fed to the user interface control unit 2.

According to the direction and magnitude of a tracing manipulation detected on the latest occasion, the user interface control unit 2 and data object control unit 3 control the display memory unit 4, and change the displays in the user interface area 101 and items-and-others display/selection area 102.

Therefore, the display of the border symbols 401, 402, 403, and 404 in the user interface area 101 is changed from time to time. The display in the user interface area 101 appears as if rubber contracts or stretches.

Accordingly, owing to a change in the border symbols in the user interface area 2, a user can discern how a tracing manipulation which the user performs is recognized by the information processing apparatus 100.

The user can appropriately adjust the tracing manipulation, which the user performs, on the basis of the discernment, and scroll the group of display items 103. Therefore, the user can appropriately scroll the group of display items and quickly access an intended display item.

[Actions to be Performed in the Information Processing Apparatus 100]

Next, referring to the flowcharts of FIG. 5 to FIG. 10, actions to be performed in the information processing apparatus 100 of the present embodiment will be summarized below. Pieces of processing mentioned in the flowcharts of FIG. 5 to FIG. 7 constitute a main routine to be executed in the information processing apparatus 100 of the present embodiment. Pieces of processing mentioned in the flowcharts of FIG. 8 to FIG. 10 constitute major sub-routines to be executed within the main routine.

Figure 5:
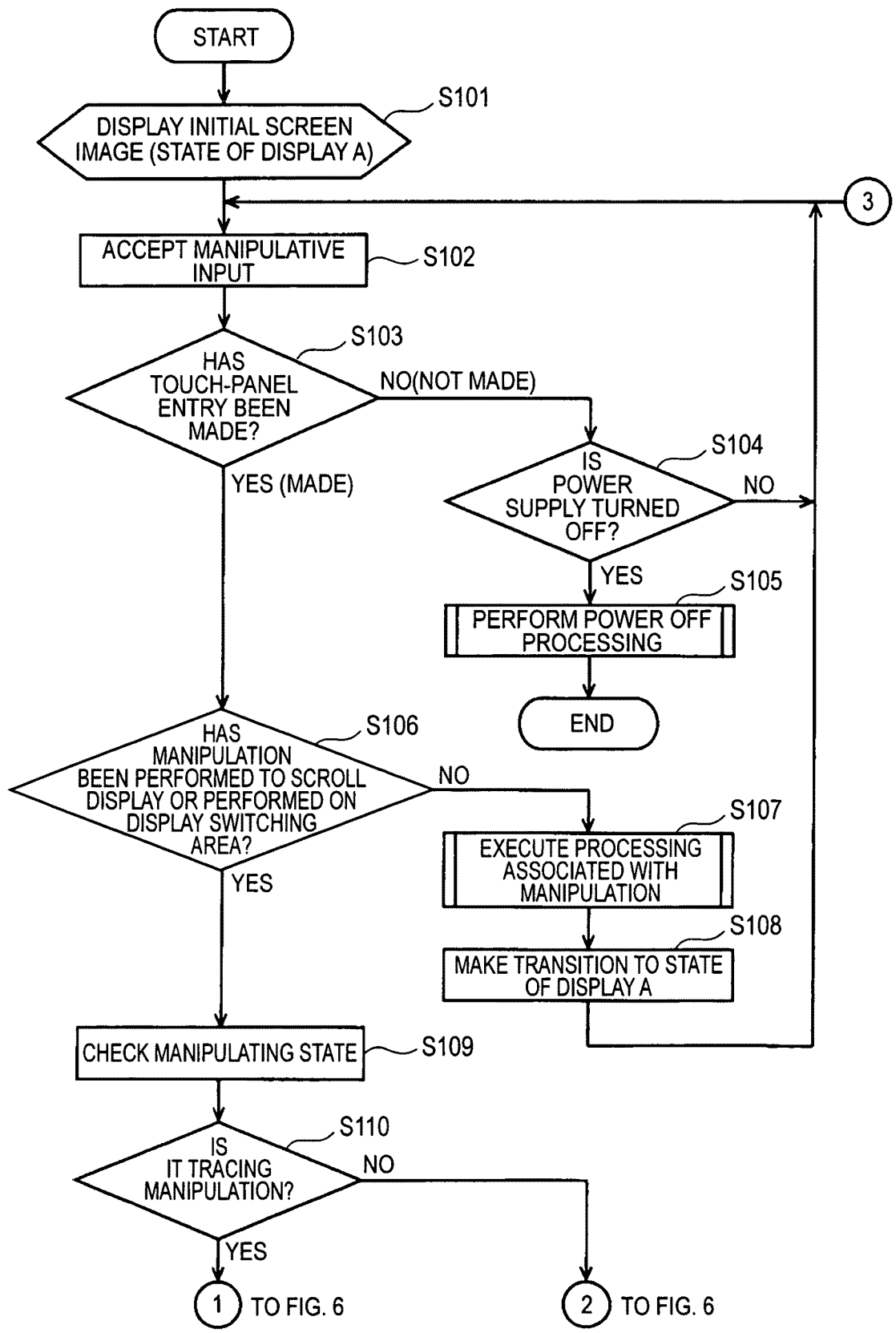
FIG. 5 is a flowchart for use in explaining a main routine to be executed in the information processing apparatus in accordance with the embodiment.
Figure 6:
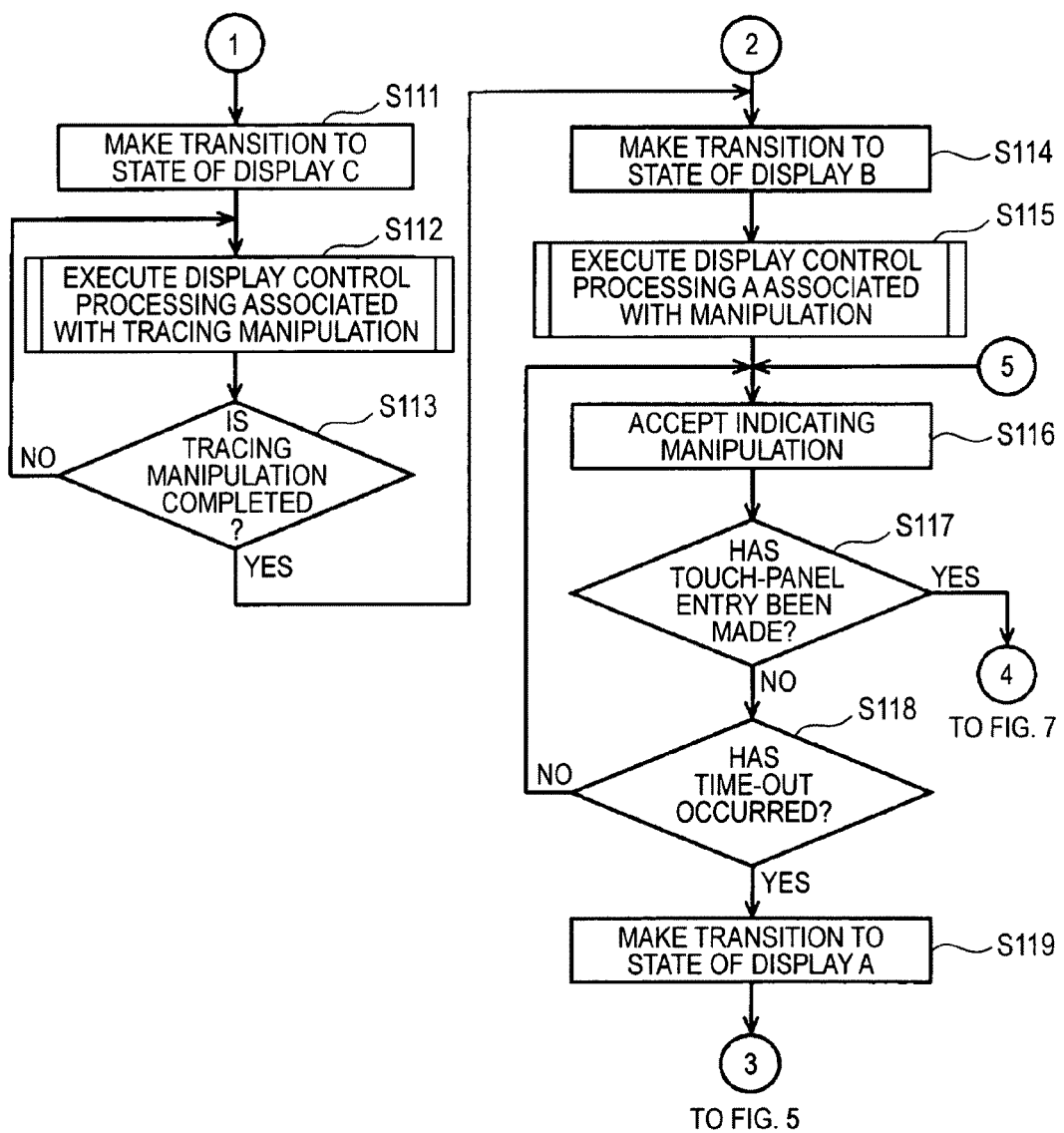
FIG. 6 is a flowchart continuing from the one shown in FIG. 5.
Figure 7:
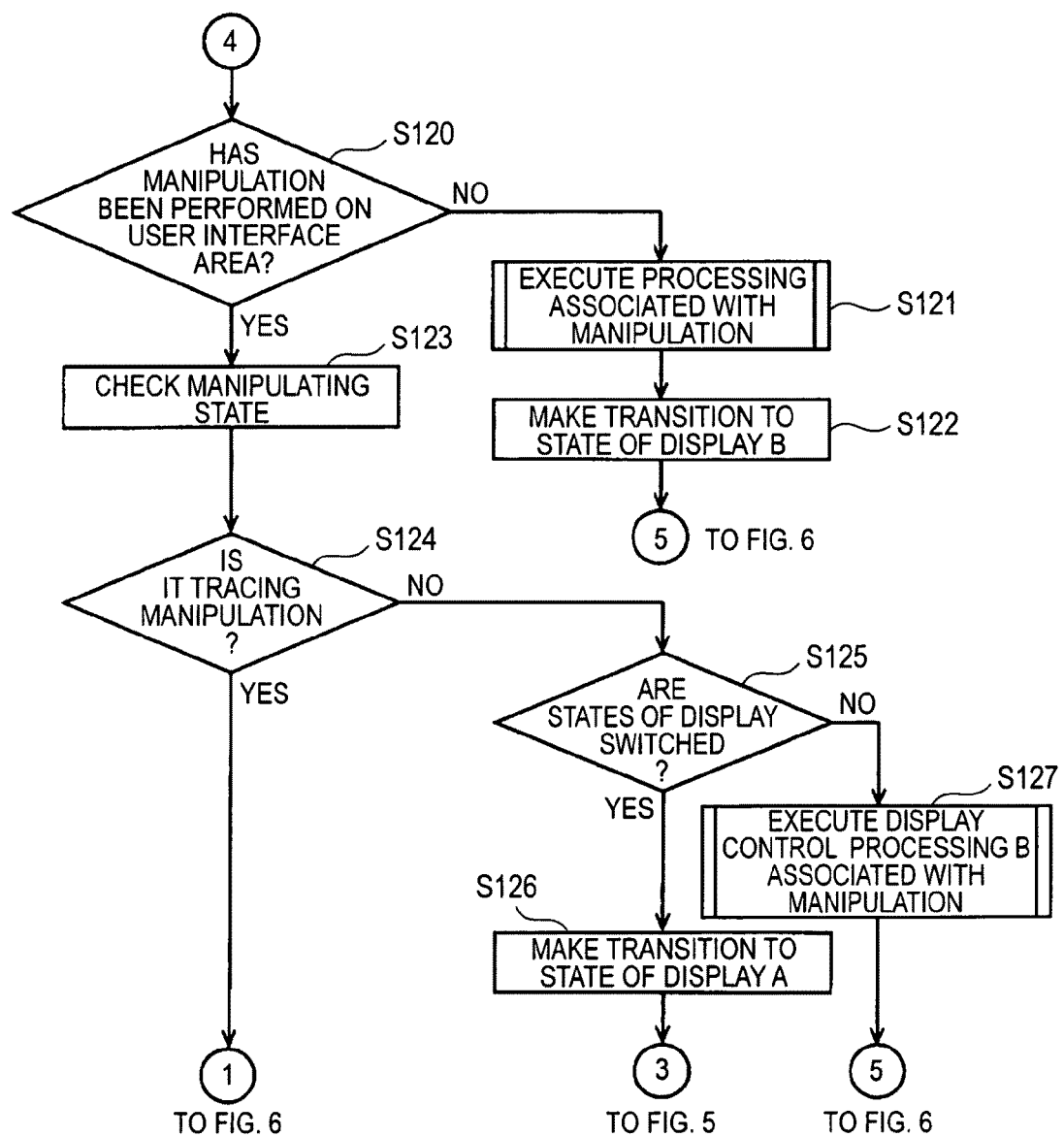
FIG. 7 is a flowchart continuing from the one shown in FIG. 6.

To begin with, the main routine mentioned in FIG. 5 to FIG. 7 will be described below. When the power supply of the information processing apparatus 100 of the present embodiment is turned on, the pieces of processing mentioned in FIG. 5 to FIG. 7 are executed by a control section composed of the user interface control unit 2, data object control unit 3, and overall control unit 7.

When the power supply of the information processing apparatus 100 is turned on, the user interface control unit 2 and data object control unit 3 control the display memory unit 5 so as to display an item selection initial screen image (item selection screen image) having the style shown in FIG. 2 on the display screen 5G (step S101).

The screen image to be displayed at step S101 is an image including, as shown in FIG. 2, the user interface area 101 and items-and-others display/selection area 102. The display taking on the state of display A is set in the user interface area 101, and a group of display items (a group of data objects) associated with a predetermined facility is displayed in the items-and-others display/selection area 102.

Thereafter, the user interface control unit 2 accepts an indicating manipulation performed by a user (touch-panel entry) by way of the input sensing device 1 (step S102). The user interface control unit 2 then decides whether it has accepted an indicating manipulation by way of the input sensing device 1 (step S103).

If a decision is made during the deciding processing of step S103 that any indicating manipulation has not been accepted by way of the input sensing device 1, the overall control unit 7 decides whether the power supply of the information processing apparatus 100 has been turned off (step S104).

The deciding processing of step S104 is achieved by deciding, for example, whether the power supply has been turned off by manipulating a power on/off key provided as a hardware key.

If a decision is made during the deciding processing of step S104 that the power supply has not been turned off, the overall control unit 7 controls the components of the apparatus so as to repeat pieces of processing beginning with the processing of step S102.

If a decision is made during the deciding processing of step S104 that the power supply has been turned off, the overall control unit 7 controls the components of the apparatus, and executes power off processing by closing an opened file and ceasing feed of power to the components (step S105). The overall control unit 7 then terminates the main routine mentioned in FIG. 5 to FIG. 7.

If a decision is made during the deciding processing of step S103 that an indicating manipulation has been accepted by way of the input sensing device 1, the user interface control unit 2 decides whether the indicating manipulation has been performed on the user interface area 101 in which the item shifting keys 202 and 204 and display switching key 203 are displayed (step S106).

If a decision is made during the deciding processing of step S106 that the indicating manipulation has not been performed on the area in which the item shifting keys 202 and 204 and display switching key 203 are displayed, the user interface control unit 2 and overall control unit 7 execute processing associated with the indicating manipulation accepted this time (step S107).

For example, when a manipulation performed on the facility operating key 201 or 205 in the user interface area 101 is accepted, the overall control unit 7 executes a facility associated with the operating key having undergone the indicating manipulation.

When a manipulation of selecting a display item displayed in the items-and-others display/selection area 102 is accepted, the overall control unit 7 executes a facility associated with the selected display item at step S107.

After the processing of step S107 is completed, the user interface control unit 2 controls the display memory unit 5 so as to return the display on the display screen 5G to the initial screen image in which the display in the user interface area 101 takes on, as shown in FIG. 2, the state of display A (step S108). The user interface control unit 2 then repeats pieces of processing beginning with step S102. Namely, an indicating manipulation to be performed on the screen image in which the display taking on the state of display A is set is enabled.

If a decision is made during the deciding processing of step S106 that the indicating manipulation has been performed on the area in which the item shifting keys 202 and 204 and display switching key 203 are displayed, the user interface control unit 2 checks the state of the indicating manipulation accepted this time (step S109).

When it says that the state of the indicating manipulation is checked at step S109, it means that a decision is made based on pieces of information on coordinates, which are successively fed from the input sensing device 1, what manipulation has been performed on the manipulating face over the user interface area 101 by a user.

The user interface control unit 2 decides whether the user's indicating manipulation checked at step S109 is a tracing manipulation (step S110).

If a decision is made during the deciding processing of step S110 that the user's indicating manipulation checked at step S109 is a tracing manipulation, the routine proceeds to the processing of step S111 mentioned in FIG. 6. If a decision is made that the user's indicating manipulation checked at step S109 is not a tracing manipulation, the routine proceeds to the processing of step S114 mentioned in FIG. 6.

Specifically, if a decision is made at step S110 that the user's indicating manipulation is a tracing manipulation, the user interface control unit 2 controls the display memory unit 4 so as to change the display in the user interface area 101 into the state of display C (step S111). The state of display C is, as shown in FIG. 4A, a state in which the four border symbols 401, 402, 403, and 404 are included.

The user interface control unit 2 and data object control unit 3 perform, as described in conjunction with FIGS. 4A and 4B, the processing of changing the displays in the user interface area 101 and items-and-others display/selection area 102 into others (step S112). Display control processing associated with the tracing manipulation and performed at step S112 will be detailed later in conjunction with FIG. 8.

Thereafter, the user interface control unit 2 decides whether the user's finger or the like is released from the manipulating face of the user interface area 101 and the tracing manipulation is completed (step S113).

If a decision is made during the deciding processing of step S113 that the tracing manipulation is not completed, the user interface control unit 2 and data object control unit 3 repeat the pieces of processing beginning with the processing of step S112, and carry on the display control processing associated with the tracing manipulation.

If a decision is made during the deciding processing of step S113 that the tracing manipulation is completed, the user interface control unit 2 proceeds to the processing of step S114.

If a decision is made during the deciding processing of step S113 that the tracing manipulation is completed, or if a decision is made at step S110 mentioned in FIG. 5 that the user's indicating manipulation is not the tracing manipulation, pieces of processing beginning with the processing of step S114 mentioned in FIG. 6 are carried out.

In this case, first, the user interface control unit 2 controls the display memory unit 4, and changes the display in the user interface area 101 into the state of display B (step S114). The state of display B is, as shown in FIG. 3, a state in which a display dedicated to item shifting is set to include the major item shifting keys 301 and 305, the minor item shifting keys 302 and 304, and the display switching key 303.

The user interface control unit 2 and data object control unit 3 execute display control processing A according to an accepted manipulation (step S115). The display control processing to be executed at step S115 will be detailed later in conjunction with FIG. 9. Broadly, the display control processing is the processing of executing minor item shifting for the display items in the items-and-others display/selection area 102 only when the minor item shifting operating keys 202 and 204 are manipulated.

Thereafter, the user interface control unit 2 accepts an indicating manipulation, which is performed by a user, by way of the input sensing device 1 (step S116). The user interface control unit 2 decides whether an indicating manipulation has been accepted by way of the input sensing device 1 (step S117).

If a decision is made during the deciding processing of step S117 that an indicating manipulation has not been accepted by way of the input sensing device 1, whether a time-out has occurred is decided based on the result of measurement performed by the clock circuit 6 (step S118).

Specifically, after the display in the user interface area 101 is changed to the state of display B, the clock circuit 6 measures an interval between adjoining user's indicating manipulations performed on the manipulating face over the user interface area 101.

Therefore, at step S118, a decision is made on whether a time (time interval) during which an indicating manipulation is not performed on the manipulating face over the user interface area 101 by a user with the display taking on the state of display B is equal to or longer than a predetermined time interval.

If a decision is made during the deciding processing of step S118 that a time-out has not occurred, pieces of processing beginning with the processing of step S116 are repeated.

If a decision is made during the deciding processing of step S118 that a time-out has occurred, the user interface control unit 2 controls the display memory unit 4 so as to change the display in the user interface area 102 from the state of display B to the state of display A (step S119). Thereafter, the user interface control unit 2 and other control units repeat pieces of processing beginning with the processing of step S102 mentioned in FIG. 5.

If a decision is made during the deciding processing of step S117 that an indicating manipulation has been accepted by way of the input sensing device 1, the routine proceeds to the processing of step S120 mentioned in FIG. 7.

In this case, the user interface control unit 2 decides based on information on coordinates, which is fed from the input sensing device 1, whether the accepted indicating manipulation has been performed on the manipulating face over the user interface area 101 (step S120).

If a decision is made during the deciding processing of step S120 that the accepted indicating manipulation has not been performed on the manipulating face over the user interface area 101, the overall control unit 7 executes processing associated with the indicating manipulation (step S121).

Specifically, when it says that the accepted indicating manipulation has not been performed on the manipulating face over the user interface area 101, it means that the indicating manipulation is performed on the items-and-others display/selection area 102. Therefore, at step S121, the overall control unit 7 executes processing, for example, processing associated with a selected display item.

Thereafter, the user interface control unit 2 controls the display memory unit 5 so as to return the display on the display screen 5G to the screen image in which the display in the user interface area 101 takes on the state of display B (step S122). The pieces of processing beginning with the processing of step S116 mentioned in FIG. 6 are repeated. Namely, an indicating manipulation to be performed on the screen image in which the display taking on the state of display B is set is enabled.

If a decision is made at step S120 that the accepted indicating manipulation has been performed on the manipulating face over the user interface area 101, the user interface control unit 2 checks the state of the indicating manipulation accepted this time (step S123).

When it says that the state of an indicating manipulation is checked at step S123, it means that a decision is made based on pieces of information on coordinates, which are successively fed from the input sensing device 1, what manipulation a user has performed on the manipulating face over the user interface area 101.

The user interface control unit 2 decides whether the user's indicating manipulation checked at step S123 is a tracing manipulation (step S124).

If a decision is made during the deciding processing of step S124 that the user's indicating manipulation checked at step S123 is a tracing manipulation, the routine proceeds to the processing of step S111 mentioned in FIG. 6. Pieces of processing associated with the tracing manipulation and beginning with the processing of step S111 are then carried out.

If the result of checking decided at step S124 is not a tracing manipulation, the user interface control unit 2 decides whether the user's indicating manipulation checked at step S123 is a tapping manipulation performed on the display switching key 303 (step S125).

If a decision is made during the deciding processing of step S125 that the indicating manipulation is a tapping manipulation performed on the display switching key 303, the user interface control unit 2 controls the display memory unit 4 so as to change the display in the user interface area 101 from the state of display B to the state of display A. Thereafter, the user interface control unit 2 and others repeat pieces of processing beginning with the processing of step S102 mentioned in FIG. 5.

If a decision is made during the deciding processing of step S125 that the indicating manipulation is not a tapping manipulation performed on the display switching key 303, the user interface control unit 2 and data object control unit 3 execute display control processing B according to the accepted manipulation (step S127).

Figure 10:
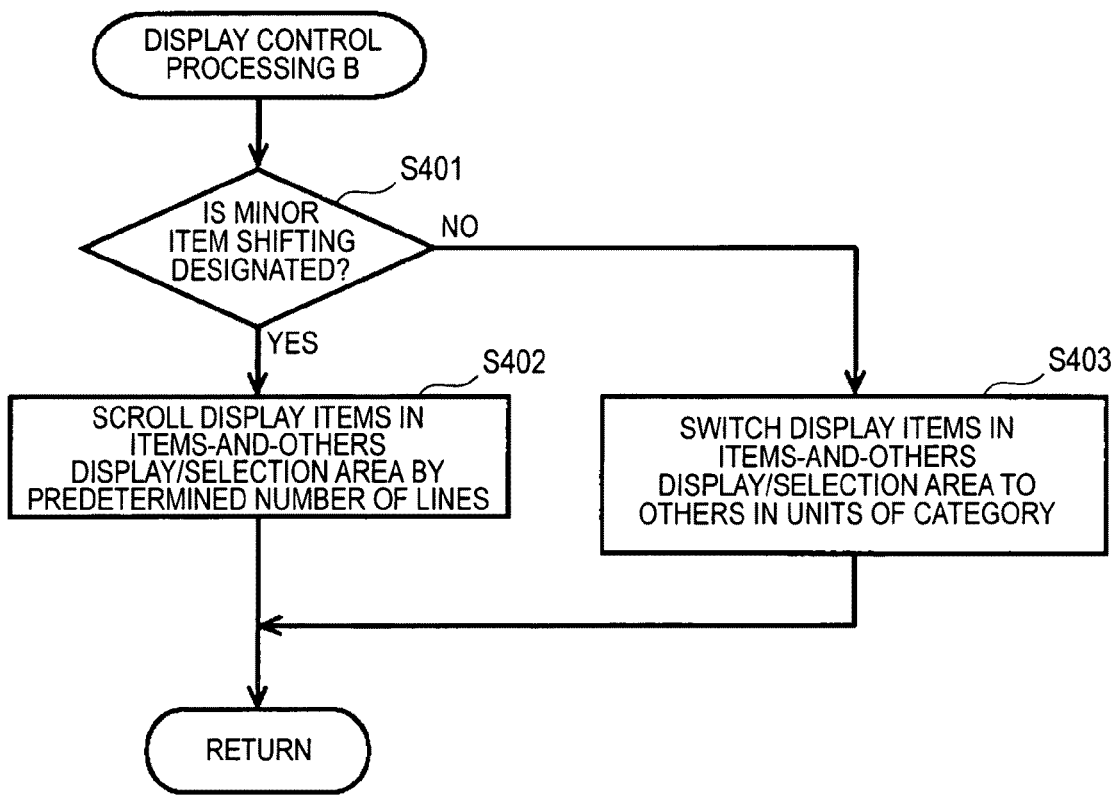
FIG. 10 is a flowchart for use in explaining display control processing B to be carried out at step S127 mentioned in FIG. 7.

The display control processing B to be executed at step S127 will be detailed later in conjunction with FIG. 10. Broadly, only when any of the major item shifting keys 301 and 305 and the minor item shifting keys 302 and 304 is manipulated, item shifting is executed for the display items in the items-and-others display/selection area 102. After the processing of step S127 is completed, the user interface control unit 2 and others repeat pieces of processing beginning with the processing of step S116 mentioned in FIG. 6.

As mentioned above, in the main routine of the information processing apparatus 100 of the present embodiment, the display on the display screen 5G can be appropriately controlled responsively to an indicating manipulation that is performed by a user and accepted by way of the manipulating face of the input sensing device 1.

Namely, one or both of the displays in the user interface area 101 and items-and-others display/selection area 102 on the display screen 5G can be appropriately changed responsively to a user's indicating manipulation.

[Display Control Processing Associated with a Tracing Manipulation]

Figure 8:
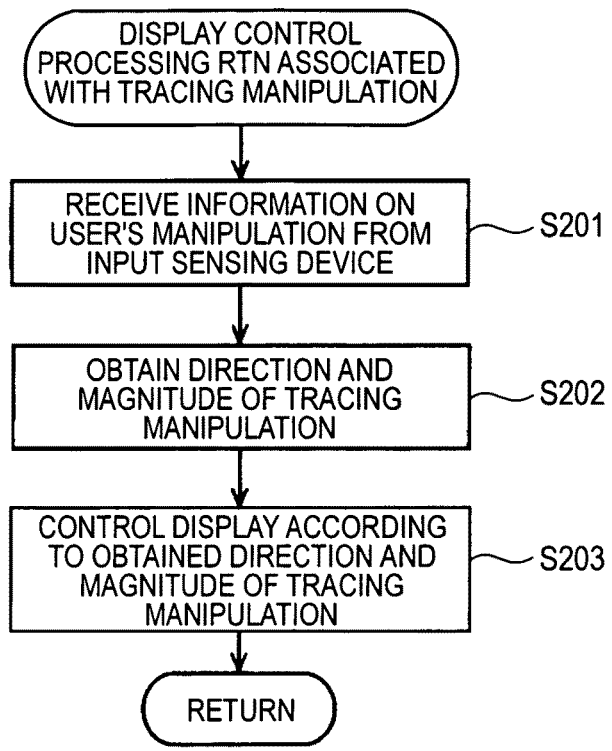
FIG. 8 is a flowchart for use in explaining display control processing to be carried out according to a tracing manipulation at step S112 mentioned in FIG. 6.

Next, display control processing associated with a tracing manipulation and executed at step S112 mentioned in FIG. 6 will be concretely described below. FIG. 8 is a flowchart for use in explaining the display control processing associated with a tracing manipulation executed at step S112 mentioned in FIG. 6.

In the display control processing associated with a tracing manipulation, first, the user interface control unit 2 receives information on a user's manipulation fed from the input sensing device 1 formed as a touch panel or the like (step S201). The information on a user's manipulation is information on coordinates on the manipulating face that changes along with a user's tracing manipulation.

The user interface control unit 2 uses the pieces of information on a user's manipulation, which have been received at step S201, to obtain the direction and magnitude of a tracing manipulation with the beginning point S of the tracing manipulation as a reference (step S202).

The user interface control unit 2 and data object control unit 3 control the display memory unit 4 on the basis of the direction and magnitude of the tracing manipulation obtained at step S202 so as to change the displays in the user interface area 101 and items-and-others display/selection area 102 respectively (step S203).

When the processing mentioned in FIG. 8 is repeatedly executed at step S112 in FIG. 6, the displays in the user interface area 101 and items-and-others display/selection area 102 respectively are, as described in conjunction with FIGS. 4A and 4B, controlled responsively to a user's tracing manipulation.

[Display Control Processing A]

Figure 9:
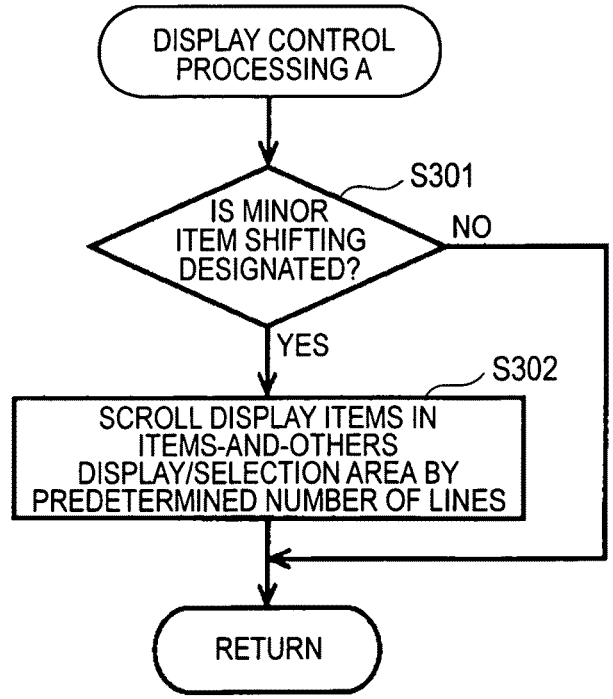
FIG. 9 is a flowchart for use in explaining display control processing A to be carried out at step S115 mentioned in FIG. 6.

Next, display control processing A executed at step S115 mentioned in FIG. 6 will be concretely described below. FIG. 9 is a flowchart for use in explaining the display control processing A executed at step S115 mentioned in FIG. 6.

The display control processing A is, as mentioned above, processing to be executed in a case where the minor item shifting key 202 or 204 is manipulated with the display, which takes on the state of display A shown in FIG. 2, set.

First, the user interface control unit 2 decides based on information on coordinates, which is fed from the input sensing device 1, whether an accepted indicating manipulation performed by a user is a manipulation performed on the minor item shifting key 202 or 204 in the state of display A (step S301).

If a decision is made during the deciding sub-processing of step S301 that the indicating manipulation is a manipulation performed on the minor item shifting key 202 or 204 in the state of display A, processing is performed to scroll the display items in the items-and-others display/selection area 102 in an indicated direction by a predetermined number of lines (step S302). The processing shown in FIG. 9 is then terminated.

In the foregoing embodiment, scrolling is performed by, for example, four lines by manipulating the minor item shifting key 202 or 204 once. However, the present invention is not limited to this mode. Alternatively, scrolling may be performed in units of one line or plural lines.

If a decision is made during the deciding sub-processing of step S301 that the indicating manipulation is not a manipulation performed on the minor item shifting key 202 or 204 in the state of display A, the necessity of changing the display in the items-and-others display/selection area 102 is obviated. The processing described in FIG. 9 is terminated.

[Display Control Processing B]

Next, display control processing B to be executed at step S127 mentioned in FIG. 7 will be concretely described below. FIG. 10 is a flowchart for use in explaining the display control processing B to be executed at step S127 mentioned in FIG. 7.

The display control processing B is processing to be executed in a case where any of the major item shifting keys 301 and 305 and minor item shifting keys 302 and 304 is manipulated with the display which takes on the state of display B shown in FIG. 3 set.

First, the user interface control unit 2 decides based on information on coordinates which is fed from the input sensing device 1, whether an accepted indicating manipulation performed by a user is a manipulation performed on the minor item shifting key 302 or 304 in the state of display B (step S401).

If a decision is made during the deciding sub-processing of step S301 that the indicating manipulation is a manipulation performed on the minor item shifting key 302 or 304, processing is performed to scroll the item display in the items-and-others display/selection area 102 in an indicated direction by a predetermined number of lines (step S402). The processing shown in FIG. 10 is then terminated.

In the embodiment, a display is scrolled by, for example, four lines by manipulating the minor item shifting key 202 or 204 once. However, the present invention is not limited to this mode. Alternatively, a display may be scrolled in units of one line or plural lines.

If a decision is made during the deciding processing of step S401 that the indicating manipulation is not a manipulation performed on the minor item shifting key 202 or 204 in the state of display B, the indicating manipulation is recognized as a manipulation performed on the major item shifting operating key 301 or 305 in the state of display B.

This is because if the display switching key 303 is manipulated at step S125 mentioned in FIG. 7, the processing of step S126 is carried out but the processing of step S127 will not be performed.

Therefore, if a decision is made during the deciding processing of step S401 that the indicating manipulation is not a manipulation performed on the minor item shifting operating key 202 or 204 in the state of display B, the item display in the items-and-others display/selection area 102 is changed in units of a category (step S402). The processing shown in FIG. 10 is then terminated.

Owing to the pieces of processing explained in conjunction with the flowcharts of FIG. 5 to FIG. 10, a user can switch from a facility to an intended facility or search or select an intended display item quickly by performing a very simple manipulation without performing a complex manipulation.

[Concrete Examples of Minor Item Shifting and Major Item Shifting]

As mentioned above, in the information processing apparatus 100 of the present embodiment, when the display in the user interface area 101 takes on the state of display B, both minor item shifting and major item shifting can be used appropriately.

For minor item shifting and major item shifting, a unit for shifting may be varied depending on the kind of display items which are objects of search or selection and displayed in the items-and-others display/selection area 102. A description will be concretely made below.

[Item Selection Screen Such as a Menu]

FIGS. 11A to 11D are diagrams for use in explaining the different usages of the minor item shifting operating keys and major item shifting operating keys in an item selection screen, for example, a menu display. An example shown in FIGS. 11A to 11D is identical to the one described in conjunction with FIG. 3.

Specifically, as shown in FIGS. 11A to 11D, the display taking on the state of display B is set in the user interface area 101 on the display screen 5G. In this case, the state of display B is a state in which the back-direction major item shifting key 301, back-direction minor item shifting key 302, display switching key 303, advance-direction minor item shifting key 304, and advance-direction major item shifting key 305 are included.

In the example shown in FIGS. 11A to 11D, a facility name 306 of a facility currently designated to be executed is displayed in the items-and-others display/selection area 102. A group of items with which pieces of processing executable by the facility are associated is also displayed.

Assume that when the fifth to eighth display items associated with the facility 1 are, as shown in FIG. 11A, displayed in the items-and-others display/selection area 102, the back-direction minor item shifting key 302 is manipulated.

In this case, the display in the items-and-others display/selection area 102 is returned to restore, for example, four preceding items, and the first to fourth display items associated with the facility 1 are displayed as shown in FIG. 11B. Herein, the display is scrolled by four items. Alternatively, the display may be scrolled in units of an appropriate number of items.

As mentioned above, when the minor item shifting key is manipulated, the display of display items can be changed with an item (line), which is the minimum unit for scrolling, as a reference.

Assume that when the first to fourth display items associated with the facility 3 are, as shown in FIG. 11C, displayed in the items-and-others display/selection area 102, the back-direction major item shifting key 301 is manipulated.

In this case, the display in the items-and-others display/selection area 102 is switched to the display of the first to fourth display items associated with, as shown in FIG. 11D, the facility 2 immediately preceding the facility 3.

As mentioned above, when the major item shifting key is manipulated, the display of display items is changed in units of a facility. The change in units of a facility is one kind of switching in units of a category.

[Selection Screen Image for Selecting a Content or the Like]

FIGS. 12A to 12D are diagrams for use in explaining the different usages of the minor item shifting keys and major item shifting keys in a selection screen image through which when numerous still-image (photograph) data items are stored and preserved as contents, still-image data to be outputted is selected.

In this example, a year/month/day of photography is appended as index information to each of still-image data items, and the still-image data items are divided into groups in association with years/months/days of photography.

Specifically, the display taking on the state of display B is, as shown in FIGS. 12A to 12D, set in the user interface area 101 on the display screen 5G. In this case, the state of display B is a state in which the back-direction major item shifting key 301, back-direction minor item shifting key 302, display switching key 303, advance-direction minor item shifting key 304, and advance-direction major item shifting key 305 are included.

In the items-and-others display/selection area 102, thumbnail images of numerous still-image data items preserved in a memory unit (not shown in FIG. 1) of the information processing apparatus 100 are displayed. In the upper part of the items-and-others display/selection area 102, a year/month/day of photography concerning the still-image data items consistent with the displayed thumbnail images is displayed as a display 307.

Figures 12A, 12B, 12C, 12D:
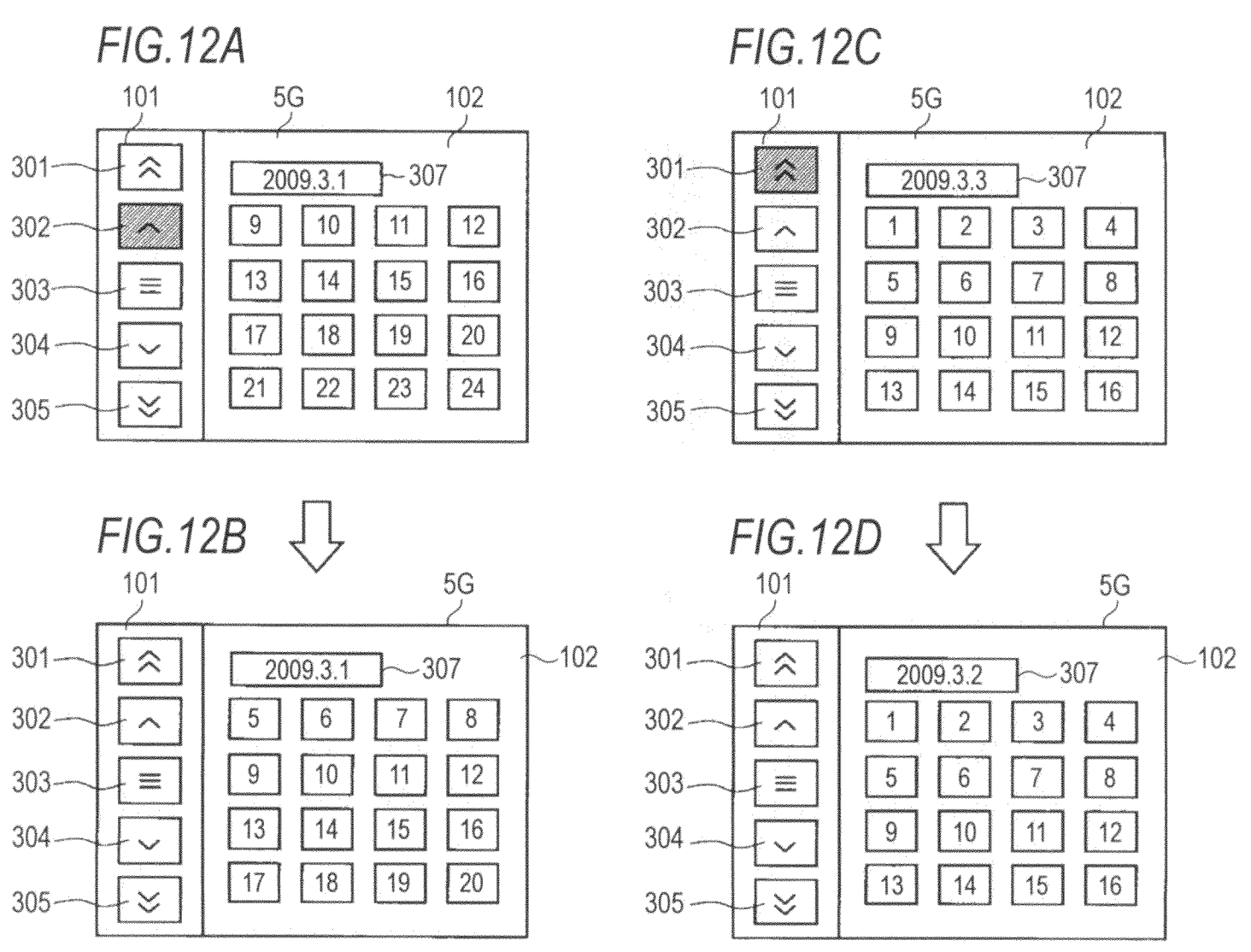

As shown in FIG. 12A, sixteen thumbnail images consistent with the ninth to twenty-fourth still-image data items acquired on Mar. 1, 2009 are displayed in four rows and four columns in the items-and-others display/selection area 102. Assume that the back-direction minor item shifting key 302 is manipulated.

In this case, the display in the items-and-others display/selection area 102 is returned to restore one preceding line, and sixteen thumbnail images consistent with the fifth to twentieth still-image data items acquired on Mar. 1, 2009 are displayed as shown in FIG. 12B. Herein, the display is scrolled by one line. Alternatively, the display may be scrolled in units of an appropriate number of lines.

As mentioned above, when the minor item shifting key is manipulated, the display of display items is changed with a line, which is the minimum unit for scrolling, as a reference.

Assume that sixteen thumbnail images consistent with the first to sixteenth still-image data items acquired on Mar. 3, 2009 are, as shown in FIG. 12C, displayed in four rows and four columns in the items-and-others display/selection area 102. Assume that the back-direction major item shifting key 301 is manipulated.

In this case, as the display in the items-and-others display/selection area 102, thumbnail images consistent with still-image data items to which a date of photography that precedes Mar. 3, 2009 and is closest to Mar. 3, 2009 is appended are displayed as shown in FIG. 12D.

For the display shown in FIG. 12D, the state shown in FIG. 12C is changed to a state in which sixteen thumbnail images consistent with the first to sixteenth still-image data items acquired on Mar. 2, 2009 are displayed.

As mentioned above, when the major item shifting operating key is manipulated, the display of display items is changed in units of a year/month/day of photography. The change in units of a year/month/day of photography is a kind of switching in units of a category.

A description has been made of minor item shifting and major item shifting to be performed in the back direction. Even for minor item shifting and major item shifting to be performed in the advance direction, display control can be achieved in the same manner, though a data shifting direction is reverse.

The examples described in conjunction with FIGS. 11A to 11D and FIGS. 12A to 12D are mere examples. The unit for item shifting may be any of various units. In particular, for major item shifting, various units are conceivable based on employed categories.

FIG. 13 is a diagram for use in explaining examples of a unit for processing to be employed in the information processing apparatus 10 in a case where pieces of information capable of being divided into categories on the basis of pieces of appended index information are displayed as display items.

In the information processing apparatus 100, in addition to pieces of information necessary to display an item selection screen image such as a menu, various contents such as those represented by the foregoing still-image data items is assumed to be able to be stored and preserved. In this case, when the item selection screen image or a content selection screen image is displayed and used, the major item shifting keys can be used to switch displays of display items in units of any of various categories.

For example, assume that a facility name, a date, face-recognition information, positional information, and event information are, as shown in FIG. 13, appended as piece of index information to display items (menu items or display items indicating contents).

Now, the facility name is a name assigned to a facility with which display items are associated, such as, the facility 1 or facility 2. The date is information on a year/month/day of photography or the like concerning still-image data. The face-recognition information is still-image data of a face to be used as a reference in a case where still-image data items acquired by performing photography are sorted in association with faces designated as references.

The positional information is information representing a district specified in, for example, a map on the basis of positional information acquired by, for example, a global positioning system (GPS). Incidentally, the positional information may be the positional information acquired by the GPS. The event information is information representing a name of an event whose contents are produced, for example, a name of a conference or a name of a concert.

When the above pieces of information are appended as indices to display items or contents indicated by display items, the pieces of information are adopted as categories. The display items can be switched to others in units of a category.

Specifically, as shown in FIG. 13, when a facility name is appended as index information to display items, if minor item shifting is designated, the display of the display items can be scrolled in units of an item (line). If major item shifting is designated, the display of the display items can be switched to another in units of a facility.

When a date is appended as index information to display items, if minor item shifting is designated, the display of the display items can be scrolled in units of a line. If major item shifting is designated, the display of the display items can be switched to another in units of a date.

When face-recognition information is appended as index information to display items, if minor item shifting is designated, the display of the display items can be scrolled in units of a line. If major item shifting is designated, the display of the display items can be switched to another in units of a person (face).

When positional information is appended as index information to display items, if minor item shifting is designated, the display of the display items can be scrolled in units of a line. If major item shifting is designated, the display of the display items can be switched to another in units of a place or a district.

When event information is appended as index information to display items, if minor item shifting is designated, the display of the display items can be scrolled in units of a line. If major item shifting is designated, the display of the display items can be switched to another in units of an event.

As mentioned above, various pieces of index information appended to display items or contents indicated by the display items are regarded as categories, and display items are switched to others in units of a category.

The categories shown in FIG. 13 are mere examples. Other various pieces of index information can be used as categories.

[Adaptation of the Information Processing Apparatus in Accordance with the Present Embodiment of the Present Invention to an Imaging Apparatus]

Next, a description will be made of a case where the information processing apparatus in accordance with the embodiment of the present invention is adapted to a video camera (imaging apparatus).

Figure 14A:
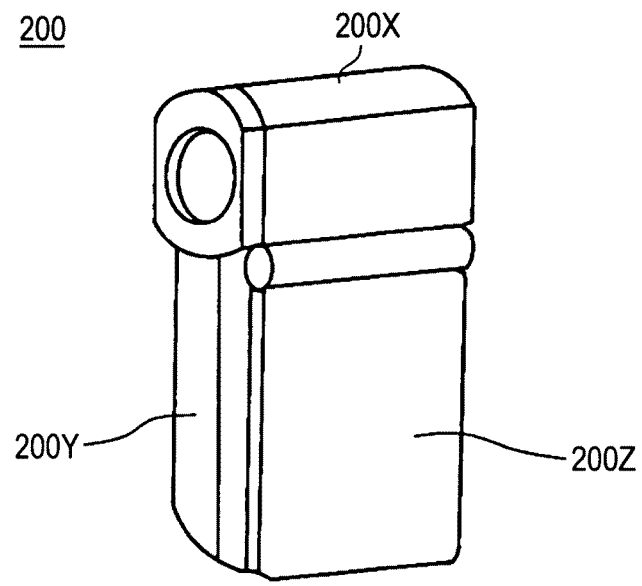
FIGS. 14A and 14B are diagrams for use in explaining the appearance of a video camera to which the information processing apparatus in accordance with the embodiment of the present invention is adapted.
Figure 14B:
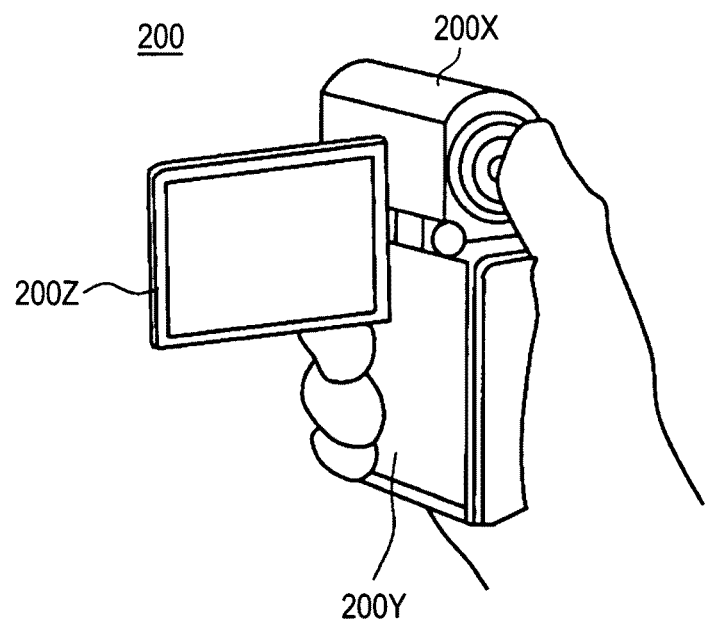
Figure 16:
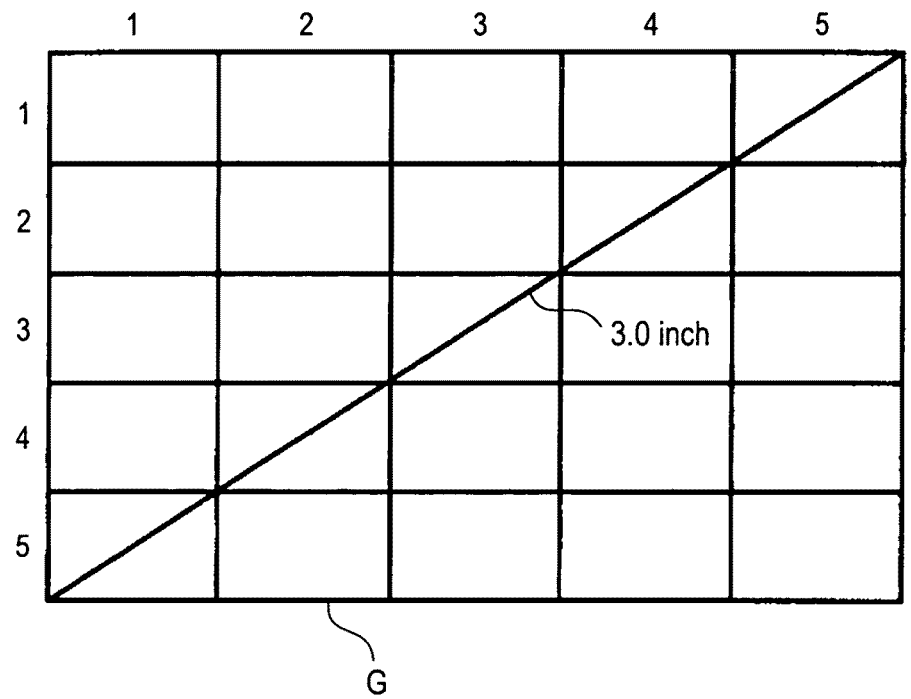
FIG. 16 is a diagram showing an example of allocation of operating buttons to a screen whose screen size is about 3 inch.
Figure 17:
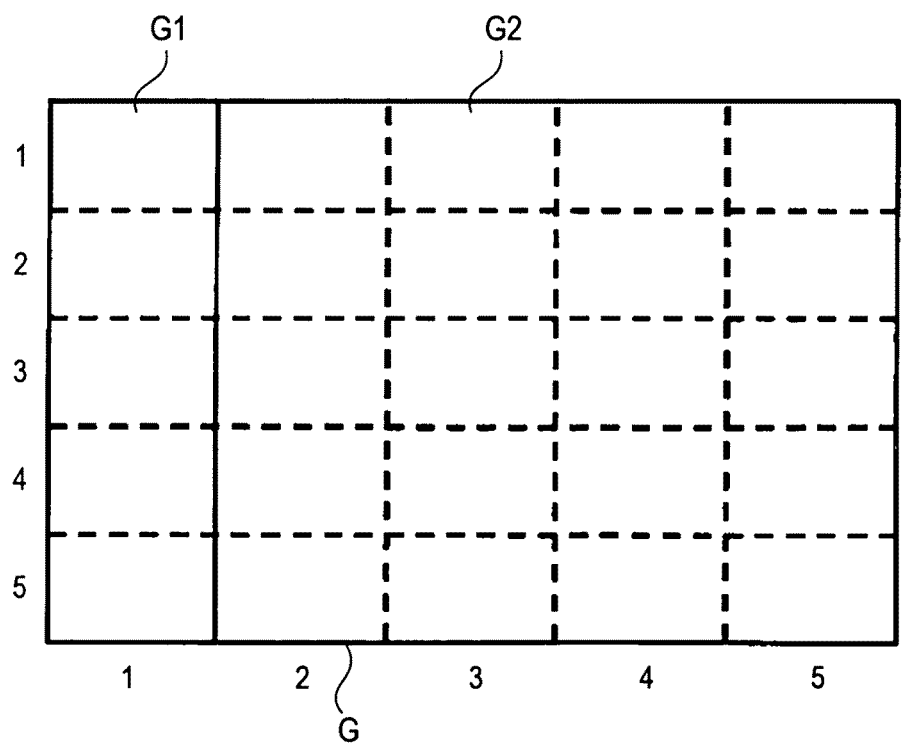
FIG. 17 is a diagram showing an example of designation of an operating area on a screen whose screen size is about 3 inch.
Figure 18A:
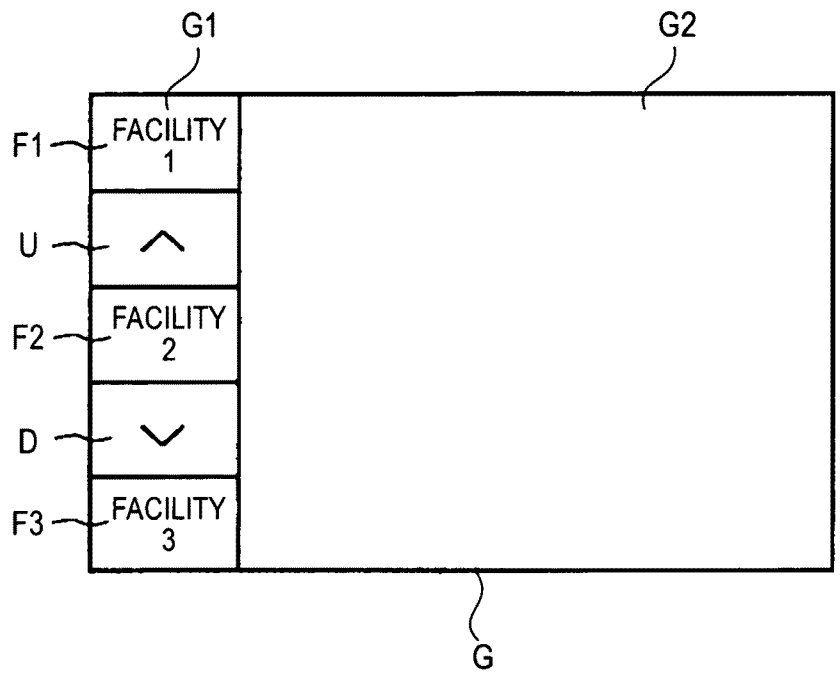
FIGS. 18A and 18B are diagrams showing examples of allocation of operating buttons to an operating area defined on a screen whose screen size is about 3 inch.
Figure 18B:
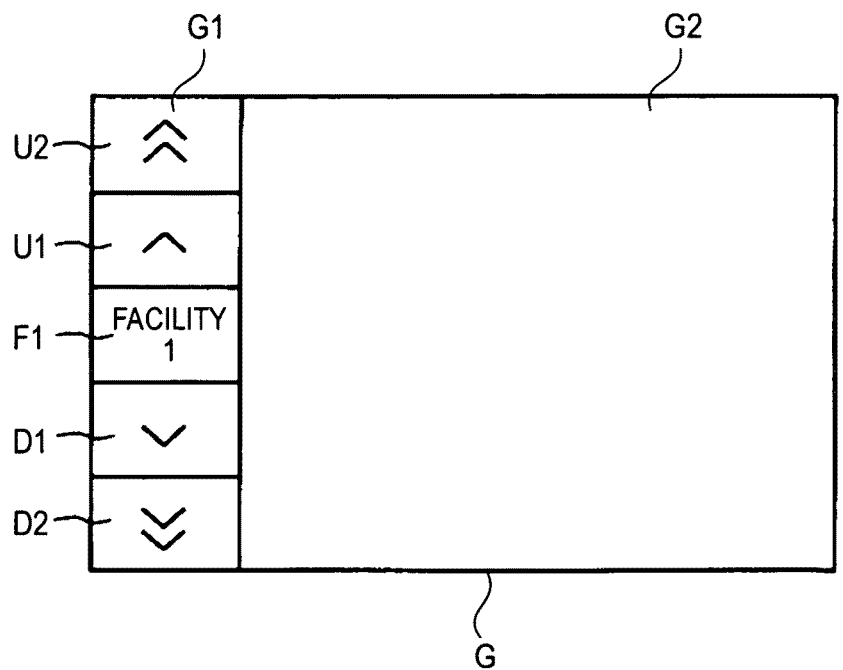

FIGS. 14A and 14B are diagrams for use in explaining the appearance of a video camera to which the information processing apparatus in accordance with the embodiment of the present invention is adapted. As shown in FIG. 14A, a video camera 200 in accordance with the present embodiment broadly includes a lens barrel section 200X in which a lens unit is incorporated, a handhold section 200Y to be held by a user, and a display device section 200Z composed of an imaging element such as an LCD and a touch panel.

When the video camera 200 is used for imaging, the display device section 200Z is, as shown in FIG. 14B, opened with respect to the handhold section 200Y, and the handhold section 200Y is held with a user's right hand. While an image picked up through the lens barrel section 200X is displayed on the display screen of the display element of the display device section 200Z and checked, imaging can be carried out.

The video camera 200 can be utilized with various item selection screen images displayed in any of the modes described in conjunction with FIG. 2 to FIG. 4B. In this case, since the video camera 200 is, as shown in FIG. 14B, often used with the handhold section 200Y held with the right hand, the touch panel on the display screen is often manipulated with the left hand.

Therefore, as described in conjunction with FIG. 2 to FIG. 4B, since the user interface area 101 is disposed on the left-hand side of the display screen, a user-friendly video camera with excellent operability has been realized.

FIG. 15 is a block diagram for use in explaining an example of the configuration of the video camera 200 to which the information processing apparatus in accordance with the embodiment of the present invention is adapted. To begin with, a description will be made of actions to be performed in the video camera 200 in a case where a picture and sounds that are picked up are recorded in a recording medium.

A key input circuit 221 is provided with various operating keys such as an imaging initiation key, an imaging suspension key, a standby key, a reproduction key, a reproduction suspension key, a quick advance key, and a quick return key, accepts an entering manipulation performed by a user, and feeds a signal resulting from the entering manipulation to a control unit 220.

The control unit 220 is a microcomputer having a CPU, a ROM, a RAM, a nonvolatile memory, and a clock circuit interconnected over a CPU bus, though these components are not shown. As shown in FIG. 15, the control unit 220 feeds control signals to the components of the video camera so as to control the components.

Therefore, the control unit 220 controls the components of the video camera responsively to an indicating manipulation performed by a user and accepted by way of the key input circuit 221, and executes processing, which is associated with the user's indication, in the video camera 200.

When accepting an indicating manipulation, which is performed to initiate imaging, by way of the key input circuit 221, the control unit 220 controls the components of the video camera so as to initiate imaging processing.

In this case, a microphone unit 201 collects ambient sounds, converts them into an electric signal, and feeds the signal to an audio signal processing circuit 202. The audio signal processing circuit 202 performs various pieces of audio signal processing such as amplifying processing, noise reducing processing, and analog-to-digital converting processing on the received audio signal, and feeds a resultant digital audio signal to a convolution/separation circuit 203.

A lens unit 204 has an exposure value and a focus thereof controlled via the control unit 220, picks up an image of a subject, and forms an image on the image formation surface of an image sensor included in a light receiving unit 205 in the succeeding stage.

The light receiving unit 205 includes the image sensor, for example, a charge-coupled device (CCD) or a complementary metal oxide semiconductor (CMOS) image sensor. The light receiving unit 205 converts the image, which is formed on the image formation surface of the image sensor thereof, into an electric signal, and feeds the signal to a camera signal processing circuit 206.

The camera signal processing circuit 206 converts a received video signal into a digital signal, performs various pieces of camera signal processing such as wave detecting processing, white-balance adjustment, synchronization processing, and gamma correction, and feeds a resultant digital video signal to the convolution/separation circuit 203.

The convolution/separation circuit 203 compresses data items carried by the received digital audio signal and digital video signal, performs multiplexing processing so as to produce record data, and feeds the record data to a recording/reproducing circuit 207.

The recording/reproducing circuit 207 records the record data fed from the convolution/separation circuit 203 in an internal memory 208 or a memory stick (registered trademark) 209. The memory stick 209 is a so-called memory card manufactured by Sony Corp. Although the memory stick 209 is employed in the video camera 200, other various kinds of memory cards can also be adopted.

As mentioned above, when a picture and sounds are recorded, the convolution/separation circuit 203 feeds video data, which has not been compressed, to a superposition circuit 213. To the superposition circuit 213, display information to be superposed on a picture that is an object of display and is fed from an on-screen display circuit 222 is also fed.

Specifically, the on-screen display circuit 222 produces various pieces of display information, which are superposed on a picture to be displayed on the display screen of an LCD panel 214 to be described later, and feeds them to the superposition circuit 213.

As pieces of display information to be produced by the on-screen display circuit 222, various guidance messages, icons, a volume adjustment bar, and various adjustment bars concerning a picture are produced.

In addition, the on-screen display circuit 222 produces, for example, border symbols and a cancellation guide symbol, which are displayed in the user interface area 101, and display items (data objects), and feeds them to the superposition circuit 213.

The superposition circuit 213 superposes pieces of display information, which are fed from the on-screen display circuit 222, on a video signal fed from the convolution/separation circuit 203, converts a resultant signal into an analog signal, and feeds the analog signal to an LCD controller panel 214.

Accordingly, a picture having a picture, which is formed by the on-screen display circuit 222, superposed on a picture captured by the lens unit 204 can be displayed on the display screen of the LCD panel 214 and provided for a user.

The on-screen display 222 produces display information, which is superposed, under the control of the control unit 220 only when the production is necessary, but does not produce the display information all the time. When the on-screen display 222 does not produce the display information, only the picture captured by the lens unit 204 is displayed on the LCD panel 214.

As mentioned above, when a picture and sounds are recorded, audio data that is not compressed is fed from the convolution/separation circuit 203 to an audio output unit 211. The audio output unit 211 converts the received audio data into an analog audio signal, performs processing such as amplification on the analog audio signal under the control of the control unit 220, and feeds the resultant audio signal to a loudspeaker 212.

Thus, sounds collected by the microphone unit 201 can be released through the loudspeaker 212, and provided for a user.

Next, a description will be made of a case where record data recorded in the internal memory 208 or memory stick 209 (data having video data and audio data multiplexed) is reproduced.

When accepting an indicating manipulation, which is performed to initiate reproduction of record data recorded in the memory, via the key input circuit 221, the control unit 220 controls the components of the video camera to initiate reproducing processing to be performed on the record data.

In this case, the recording/reproducing circuit 207 reads the record data, which is indicated to be reproduced, from the internal memory 208 or memory stick 209 which stores the data, and feeds the read record data to the convolution/separation circuit 203.

The convolution/separation circuit 203 separates the record data, which is fed from the recording/reproducing circuit 207, into audio data and video data that have been multiplexed, and decompresses the audio data and video data so as to restore the audio data and video data that are obtainable before being compressed.

The convolution/separation circuit 203 feeds the restored video data to the LCD panel 214 via the superposition circuit 213. Thus, a picture represented by the video data stored in the memory can be displayed on the display screen of the LCD panel 214.

Even in this case, the control unit 220 controls, if necessary, the on-screen display circuit 222 so that various pieces of display information can be superposed on the picture displayed on the display screen of the LCD panel 214.

The convolution/separation circuit 203 feeds the restored audio data to the audio output unit 211. Thus, sounds represented by the audio data stored in the memory can be released through the loudspeaker 212.

In the video camera 200, a communication processing unit 223 is an external interface permitting connection to external equipment under the control of the control unit 220.

The communication processing unit 223 produces transmission data using record data recorded in the internal memory 208 or memory stick 209, and transmits the data to external equipment.

The communication processing unit 223 receives transmission data from external equipment, transforms the data into a signal having a composition usable in the video camera, and feeds the signal to the recording/reproducing circuit 207 or records the signal in the own memory.

A power circuit 240, a battery 241, a power plug 242, and a switching circuit 243 constitute a power system so as to feed power to the control unit 220 all the time.

When the power supply of the video camera 200 is turned on, the control unit 220 brings the switching circuit 243 to an on state so that power will be fed to the components of the video camera 200 in order to drive the components.

When the video camera 200 whose power supply has been turned on is powered down, the control unit 220 brings the switching circuit 243 to an off state so that feed of power to the components of the video camera 200 will be ceased.

Even in the video camera 200 to which the embodiment is adapted, as shown in FIG. 15, a touch panel 215 is attached to the display screen of the LCD panel 214. The manipulating face of the touch panel 215 is formed all over the display screen.

In the video camera 200, the control unit 220, on-screen display 222, superposition circuit 213, LCD panel 214, and touch panel 215 realize the information processing apparatus 100 in accordance with the embodiment of the present invention.

Specifically, in FIG. 15, the touch panel 215 realizes the input sensing device 1. The control unit 220 realizes the facilities of the user interface control unit 2, data object control unit 3, and overall control unit 7. The control unit 220 of the video camera 200 includes a clock circuit, that is, has the capability of the clock circuit 6 included in the information processing apparatus 100.

The on-screen display 222 and superposition circuit 213 realize the display memory unit 4, and the LCD panel 214 realizes the display device 5.

Accordingly, in the video camera 200, when an intended facility is selected from among various executable facilities and then executed, display styles can be changed responsively to a user's indicating manipulation in the same manner as that in the information processing apparatus 100.

Specifically, the facilities of the control unit 220, on-screen display 222, and superposition circuit 213 are used to define, as shown in FIG. 2 to FIG. 4B, the user interface area 101 and items-and-others display/selection area 102 on the display screen of the LCD panel 214.

A user performs an indicating manipulation on the manipulating face of the touch panel 215 over the user interface area 101. Thus, the display in the user interface area 101 can be changed to an appropriate one out of the displays taking on the states of display A, B, and C respectively, and the display items in the items-and-others display/selection area 102 can be scrolled or the display of the display items can be switched to another.

[Brief of the Embodiment]

The information processing apparatus of the embodiment is electronic equipment including a display device on which a graphical user interface (GUI) can be displayed and an input sensing device such as a touch panel. A user interface area is defined on the display screen of the display device as a space of one column having a width that is large enough to perform manipulations with a user's finger. Item shifting keys and other various facility operating keys are expressed in the user interface area.

The user interface area is put to two states of the state of display A and state of display B. The states are switched responsively to a user's manipulation or automatically switched under the control based on a timer. As mentioned above, the state of display A is a state in which a composite display includes facility operating keys and item shifting keys, while the state of display B is a state in which a display is dedicated to scrolling manipulations.

The state of display A and state of display B can be switched responsively to a manipulation performed on a display switching key by a user. Switching from the state of display B to the state of display A can be achieved under the control based on a timer.

In the state of display A, a pair of minor item shifting keys is included for changing the display in the items-and-others display/selection area according to a scrolling method (minor item shifting) according to which all items can be treated. In the state of display A, various facilities, for example, a menu invoking facility, an imaging mode switching facility, a facility for making a transition to the state of display B are assigned to facility operating keys.

In the state of display B, a pair of minor item shifting keys, and a pair of major item shifting keys for use in switching the display in the items-and-others display/selection area from one to another in units of a category (a date in a motion-picture thumbnail reference screen image, and a facility in a facility list screen image) are included in a display. In the state of display B, a display switching key for use in switching from the state of display B to the state of display A is included in a display.

In the state of display A and state of display B, a place to which the minor item shifting keys are allocated is located at the same position. As mentioned above, two scrolling methods employed in the state of display B are a way of shifting (minor item shifting) according to which all items that are objects of scrolling manipulation are treated, and a way of shifting (major item shifting in which the leading parts of specific tags are presented. The two scrolling methods are expressed in the same screen image.

Owing to the foregoing constitutions, according to the information processing apparatus of the embodiment, in the state of display A, a facility operating key for use in selecting a facility can be disposed at the upper or lower end of the display screen capable of being readily manipulated.

For scrolling the display items in the items-and-others display/selection area, a transition is automatically made to the state of display B specialized in scrolling. Thus, a screen image that effectively uses the limited space on the display screen and is specialized in a user's intended action can be produced.

In the state of display B, the facilities for shifting items in the different shifting units are juxtaposed. Therefore, two usages that are a usage for searching an item minutely and a usage for quickly reaching a specific item can be satisfied in the same screen image.

[Method and Program in which the Present Invention is Implemented]

As apparent from the embodiment, a method and program in accordance with the embodiment of the present invention are feasible as the method and program described in conjunction with the flowcharts of FIG. 5 to FIG. 10.

In other words, the method described in conjunction with FIG. 5 to FIG. 10 is the method in accordance with the embodiment of the present invention.

A program that executes the pieces of processing described in conjunction with FIG. 5 to FIG. 10 is the program in accordance with the embodiment of the present invention.

When the program in accordance with the embodiment of the present invention is realized and installed in any of various pieces of electronic equipment including a display device such as an LCD and an input sensing device such as a touch panel, the information processing apparatus in accordance with the embodiment of the present invention is realized.

[Miscellaneous]

In the information processing apparatus 100 of the embodiment, the display device 5 realizes the capability of the display element, and the input sensing device 1 realizes the capability of the indicated position detection means. The user interface control unit 2 realizes the capability of the detection means.

In the information processing apparatus 100 of the embodiment, the user interface control unit 2, data object control unit 3, and display memory unit 4 cooperate with one another in realizing the capability of the display control means.

In the information processing apparatus 100 of the embodiment, the LCD panel 214 realizes the capability of the display element, and the touch panel 215 realizes the capability of the indicated position detection means. The control unit 220 realizes the capability of the detection means.

In the video camera 200 of the embodiment, the control unit 220, on-screen display 222, and superposition circuit 213 realize the capability of the display control means.

In the embodiment, a case where the information processing apparatus is adapted to a video camera has been described as an example of adaptation of the information processing apparatus. The present invention is not limited to the video camera. The present invention can be adapted to various pieces of electronic equipment including a display device such as an LCD and an input sensing device such as a touch panel, for example, a digital still camera, a game machine, and a portable information terminal called a personal digital assistant (PDA).

In the embodiment, the spaces among border symbols in an initial state have been described to be equal to one another. The present invention is not limited to this mode. The spaces among the border symbols in the initial state and the number of border symbols may be determined appropriately.

The border symbols are not limited to segments. Alternatively, the user interface area may be divided into plural subareas, and graphics may be displayed in the respective subareas or the subareas may be filled with different colors.

In this case, the border portions among the subareas are located at the displayed positions of the border symbols. Similarly to the case of the border symbols, the positions of the borders among the subareas are controlled to be changed. Thus, similarly to the embodiment, in the user interface area, a display that moves as if rubber contracts or stretches can be expressed.

In this case, when the size of the subareas into which the user interface area is divided is changed, the graphics displayed in the subareas are changed or the ranges of displayed colors are changed.

When the graphics displayed in the subareas are changed, the graphics may be stretched or contracted. When the ranges of the displayed colors are changed, the ranges filled with the same colors are changed along with a change in the size of the subareas.

In the information processing apparatus of the embodiment, the user interface area is, as shown in FIG. 2 and others, located on the left-hand side of the display screen with respect to a user. The present invention is not limited to this mode. Alternatively, the user interface area may be located on the right-hand side of the display screen with respect to a user.

The user interface area may be located on the upper or lower side of the display screen, and a tracing manipulation may be performed in rightward and leftward directions on the display screen.

The user interface area and items-and-others display/selection area may be located at appropriate positions on the display screen while having appropriate sizes.

In the embodiment, the input sensing device has been described as a touch panel of a so-called contact type such as a pressure-sensitive or electrostatic type. The present invention is not limited to the touch panel. The present invention can be applied to a case where a noncontact type panel capable of receiving an indication which is entered by a user, according to a change in an electrostatic capacity in a panel occurring when a user's finger approaches the panel is adopted.

The present invention can be applied to a case where a noncontact type panel capable of receiving an indication which is entered by a user, according to a change in the brightness of a panel occurring when a user's finger approaches the panel is adopted.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a display element;
an indicated position detection means whose manipulating face is placed on a display screen of the display element and which accepts an indicating manipulation performed by a user, and detects and outputs information on coordinates representing a position indicated with the indicating manipulation;
a detection means for detecting the indicated position on the display screen of the display element and the style of the indicating manipulation based on the information on coordinates fed from the indicated position detection means; and
a display control means for dividing the display screen of the display element into a first area, in which at least item shifting operating pieces are disposed, and a second area in which display items that are objects of item shifting are displayed, and for implementing control so that pieces of display information will be displayed in the first area and second area respectively,
wherein when the result of detection fed from the detection means signifies that a manipulation has been performed on the operating piece disposed in the first area, the display control means changes one or both of the first area and second area on the display screen according to a facility allocated to the operating piece, and
when the manipulation performed on one of the operating pieces disposed in the first area is a tracing manipulation, a spacing between symbols disposed in the first area is changed.

2. An information processing apparatus, comprising:
a display element;
an indicated position detection means whose manipulating face is placed on a display screen of the display element and which accepts an indicating manipulation performed by a user, and detects and outputs information on coordinates representing a position indicated with the indicating manipulation;

a detection means for detecting the indicated position on the display screen of the display element and the style of the indicating manipulation based on the information on coordinates fed from the indicated position detection means; and a display control means for dividing the display screen of the display element into a first area, in which at least item shifting operating pieces are disposed, and a second area in which display items that are objects of item shifting are displayed, and for implementing control so that pieces of display information will be displayed in the first area and second area respectively, wherein when the result of detection fed from the detection means signifies that a manipulation has been performed on the operating piece disposed in the first area, the display control means changes one or both of the first area and second area on the display screen according to a facility allocated to the operating piece, and the display control means can switch a first display, which includes a pair of item shifting operating pieces and other facility selecting operating pieces including a display switching operating piece, and a second display, which includes two pairs of item shifting operating pieces and the display switching operating piece, for the first area, and when the first display is set in the first area, if the result of detection fed from the detection means signifies that a manipulation has been performed on the item shifting operating piece, the display control means implements control so that the display in the first area will be switched from the first display into the second display and the display in the second area will be shifted.

3. The information processing apparatus according to claim 2, wherein when the first display is set in the first area, if the result of detection fed from the detection means signifies that a manipulation has been performed on the display switching operating piece in the first display, the display control means switches the display in the first area from the first display to the second display; and when the second display is set in the first area, if the result of detection fed from the detection means signifies that a manipulation has been performed on the display switching operating piece in the second display, the display control means switches the display in the first area from the second display to the first display.

4. The information processing apparatus according to claim 2 or 3, further comprising:

a measurement means for measuring a time elapsing after the display in the first area is switched from the first display to the second display, wherein after the display in the first area is switched from the first display to the second display, if an indicating manipulation performed on the first area by a user is not detected by the detection means during a certain time, the display control means switches the display in the first area from the second display to the first display.

5. The information processing apparatus according to claim 2 or 3, wherein the pair of item shifting operating pieces in the first display is a pair of first operating pieces for use in instructing item shifting in which a magnitude of shifting is small; the two pairs of item shifting operating pieces in the second display include a pair of first operating pieces for use in instructing item shifting in which a magnitude of shifting is small, and a pair of second operating pieces for use in greatly changing display items that are objects of display.

6. The information processing apparatus according to claim 5, wherein the first operating pieces are used to perform item shifting in units of a display item or a display line, and the second operating pieces are used to change a category of display items.

7. An information processing method, comprising:

allowing a display control means to divide a display screen of a display element into a first area, in which at least item shifting operating pieces are disposed, and a second area in which display items that are objects of item shifting are displayed, and implementing control so that pieces of display information will be displayed in the first area and second area respectively;

accepting an indicating manipulation which is performed by a user, by way of an indicated position detection means whose manipulating face is placed on the display screen of the display element and which accepts an indicating manipulation performed by a user, and detecting and outputting information on coordinates representing a position indicated with the indicating manipulation;

when an indicating manipulation performed by a user is accepted at the indicating manipulation accepting step, allowing a detection means to detect the indicated position on the display screen of the display element and the style of the indicating manipulation based on the information on coordinates fed from the indicated position detection means; and when the result of detection fed from the detection means at the detecting step signifies that a manipulation has been performed on an operating piece disposed in the first area, allowing the display control means to implement control so that one or both of the first area and second area on the display screen will be changed according to a facility allocated to the operating piece, wherein when the manipulation performed on one of the operating pieces disposed in the first area is a tracing manipulation, a spacing between symbols disposed in the first area is changed.

8. A non-transitory computer-readable device having recorded therein an information processing program for causing a computer installed in an information processing apparatus to execute information processing, comprising:

allowing a display control means to divide a display screen of a display element into a first area, in which at least item shifting operating pieces are disposed, and a second area in which display items that are objects of item shifting are displayed, and implementing control so that pieces of display information will be displayed in the first area and second area respectively;

accepting an indicating manipulation which is performed by a user, by way of an indicated position detection means whose manipulating face is placed on the display screen of the display element and which accepts an indicating manipulation performed by a user, and detecting and outputting information on coordinates representing a position indicated with the indicating manipulation;

when an indicating manipulation performed by a user is accepted at the indicating manipulation accepting step, allowing a detection means to detect the indicated position on the display screen of the display element and the style of the indicating manipulation based on the information on coordinates fed from the indicated position detection means; and when the result of detection fed from the detection means at the detecting step signifies that a manipulation has been performed on the operating piece disposed in the first area, allowing the display control means to implement control so that one or both of the first area and second area on the display screen will be changed according to a facility allocated to the operating piece, wherein when the manipulation performed on one of the operating pieces disposed in the first area is a tracing manipulation, a spacing between symbols disposed in the first area is changed.

9. An information processing apparatus, comprising:
a display element;
an indicated position detection unit whose manipulating face is placed on a display screen of the display element and which is configured to accept an indicating manipulation performed by a user, and detect and output information on coordinates representing a position indicated with the indicating manipulation;
a detection unit configured to detect the indicated position on the display screen of the display element and the style of the indicating manipulation based on the information on coordinates fed from the indicated position detection unit; and
a display control unit configured to divide the display screen of the display element into a first area, in which at least item shifting operating pieces are disposed, and a second area in which display items that are objects of item shifting are displayed, and to implement control so that pieces of display information will be displayed in the first area and second area respectively,
wherein when the result of detection fed from the detection unit signifies that a manipulation has been performed on the operating piece disposed in the first area, the display control unit changes one or both of the first area and second area on the display screen according to a facility allocated to the operating piece, and
when the manipulation performed on one of the operating pieces disposed in the first area is a tracing manipulation, a spacing between symbols disposed in the first area is changed.

10. The information processing apparatus according to claim 4, wherein the pair of item shifting operating pieces in the first display is a pair of first operating pieces for use in instructing item shifting in which a magnitude of shifting is small; the two pairs of item shifting operating pieces in the second display include a pair of first operating pieces for use in instructing item shifting in which a magnitude of shifting is small, and a pair of second operating pieces for use in greatly changing display items that are objects of display.

11. The information processing apparatus according to claim 10, wherein the first operating pieces are used to perform item shifting in units of a display item or a display line, and the second operating pieces are used to change a category of display items.

12. The information processing apparatus according to claim 1, wherein the display control means can switch a first display and a second display for the first area.

13. The information processing apparatus according to claim 1, wherein the tracing manipulation includes a dragging manipulation.

14. The information processing apparatus according to claim 1, wherein the tracing manipulation includes a flicking manipulation.

15. The information processing method according to claim 7, wherein the display control means can switch a first display and a second display for the first area.

16. The information processing method according to claim 7, wherein the tracing manipulation includes a dragging manipulation or a flicking manipulation.

17. The non-transitory computer-readable device according to claim 8, wherein the display control means can switch a first display and a second display for the first area.

18. The non-transitory computer-readable device according to claim 8, wherein the tracing manipulation includes a dragging manipulation or a flicking manipulation.

19. The information processing apparatus according to claim 9, wherein the display control means can switch a first display and a second display for the first area.

20. The information processing apparatus according to claim 9, wherein the tracing manipulation includes a dragging manipulation or a flicking manipulation.

21. An information processing method, comprising:
allowing a display control means to divide a display screen of a display element into a first area, in which at least item shifting operating pieces are disposed, and a second area in which display items that are objects of item shifting are displayed, and implementing control so that pieces of display information will be displayed in the first area and second area respectively;
accepting an indicating manipulation which is performed by a user, by way of an indicated position detection means whose manipulating face is placed on the display screen of the display element and which accepts an indicating manipulation performed by a user, and detecting and outputting information on coordinates representing a position indicated with the indicating manipulation;
when an indicating manipulation performed by a user is accepted at the indicating manipulation accepting step, allowing a detection means to detect the indicated position on the display screen of the display element and the style of the indicating manipulation based on the information on coordinates fed from the indicated position detection means; and
when the result of detection fed from the detection means at the detecting step signifies that a manipulation has been performed on an operating piece disposed in the first area, allowing the display control means to implement control so that one or both of the first area and second area on the display screen will be changed according to a facility allocated to the operating piece,
wherein the allowing step includes allowing the display control means to switch a first display, which includes a pair of item shifting operating pieces and other facility selecting operating pieces including a display switching operating piece, and a second display, which includes two pairs of item shifting operating pieces and the display switching operating piece, for the first area, and
when the first display is set in the first area, if the result of detection fed from the detection means signifies that a manipulation has been performed on the item shifting operating piece, the allowing step includes allowing the display control means to implement control so that the display in the first area will be switched from the first display into the second display and the display in the second area will be shifted.

22. A non-transitory computer-readable device having recorded therein an information processing program for causing a computer installed in an information processing apparatus to execute information processing, comprising:
allowing a display control means to divide a display screen of a display element into a first area, in which at least item shifting operating pieces are disposed, and a second area in which display items that are objects of item shifting are displayed, and implementing control so that pieces of display information will be displayed in the first area and second area respectively;

accepting an indicating manipulation which is performed by a user, by way of an indicated position detection means whose manipulating face is placed on the display screen of the display element and which accepts an indicating manipulation performed by a user, and detecting and outputting information on coordinates representing a position indicated with the indicating manipulation;

when an indicating manipulation performed by a user is accepted at the indicating manipulation accepting step, allowing a detection means to detect the indicated position on the display screen of the display element and the style of the indicating manipulation based on the information on coordinates fed from the indicated position detection means; and when the result of detection fed from the detection means at the detecting step signifies that a manipulation has been performed on an operating piece disposed in the first area, allowing the display control means to implement control so that one or both of the first area and second area on the display screen will be changed according to a facility allocated to the operating piece, wherein the allowing step includes allowing the display control means to switch a first display, which includes a pair of item shifting operating pieces and other facility selecting operating pieces including a display switching operating piece, and a second display, which includes two pairs of item shifting operating pieces and the display switching operating piece, for the first area, and when the first display is set in the first area, if the result of detection fed from the detection means signifies that a manipulation has been performed on the item shifting operating piece, the allowing step includes allowing the display control means to implement control so that the display in the first area will be switched from the first display into the second display and the display in the second area will be shifted.

23. An information processing apparatus, comprising:

a display element;

an indicated position detection unit whose manipulating face is placed on a display screen of the display element and which is configured to accept an indicating manipulation performed by a user, and detect and output information on coordinates representing a position indicated with the indicating manipulation;

a detection unit configured to detect the indicated position on the display screen of the display element and the style of the indicating manipulation based on the information on coordinates fed from the indicated position detection unit; and a display control unit configured to divide the display screen of the display element into a first area, in which at least item shifting operating pieces are disposed, and a second area in which display items that are objects of item shifting are displayed, and to implement control so that pieces of display information will be displayed in the first area and second area respectively, wherein when the result of detection fed from the detection unit signifies that a manipulation has been performed on the operating piece disposed in the first area, the display control unit changes one or both of the first area and second area on the display screen according to a facility allocated to the operating piece, and the display control unit can switch a first display, which includes a pair of item shifting operating pieces and other facility selecting operating pieces including a display switching operating piece, and a second display, which includes two pairs of item shifting operating pieces and the display switching operating piece, for the first area, and when the first display is set in the first area, if the result of detection fed from the detection unit signifies that a manipulation has been performed on the item shifting operating piece, the display control unit implements control so that the display in the first area will be switched from the first display into the second display and the display in the second area will be shifted.

* * * * *